United States Patent
Edge et al.

(10) Patent No.: US 9,301,093 B2
(45) Date of Patent: *Mar. 29, 2016

(54) METHODS AND APPARATUS FOR IDENTIFYING AND AUTHORIZING LOCATION SERVERS AND LOCATION SERVICES

(71) Applicant: QUALCOMM Incorporated, San Diego, CA (US)

(72) Inventors: Stephen William Edge, Escondido, CA (US); Andreas Klaus Wachter, Menlo Park, CA (US); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,537

(22) Filed: Apr. 9, 2014

(65) Prior Publication Data

US 2014/0221019 A1    Aug. 7, 2014

Related U.S. Application Data

(63) Continuation of application No. 13/366,308, filed on Feb. 4, 2012, now Pat. No. 8,738,027.

(60) Provisional application No. 61/440,251, filed on Feb. 7, 2011, provisional application No. 61/451,059, filed (Continued)

(51) Int. Cl.
*H04W 4/02* (2009.01)
*H04L 29/06* (2006.01)
(Continued)

(52) U.S. Cl.
CPC ............. *H04W 4/02* (2013.01); *H04L 63/0281* (2013.01); *H04L 67/16* (2013.01); *H04W 12/08* (2013.01); *H04W 4/20* (2013.01); *H04W 76/007* (2013.01)

(58) Field of Classification Search
CPC ....... H04W 4/02; H04W 76/007; H04W 4/20; H04W 12/08; H04L 67/16; H04L 63/0281
USPC ............. 455/456.3, 456.1, 414.3, 433, 404.2; 709/203, 233, 228, 217

See application file for complete search history.

(56) References Cited

U.S. PATENT DOCUMENTS 6,789,078 B2    9/2004    Saitou et al.
7,120,675 B1    10/2006   Shupak et al.
(Continued)

FOREIGN PATENT DOCUMENTS

CN    101087482 A    12/2007
CN    101227746 A    7/2008
(Continued)

OTHER PUBLICATIONS

Dierks, T., et al., "The Transport Layer Security (TLS) Protocol Version 1.1; RFC 4346", IETF, Apr. 2006, XP015054952.

(Continued)

*Primary Examiner* — Charles Shedrick
(74) *Attorney, Agent, or Firm* — Berkeley Law & Technology Group, LLP

(57) ABSTRACT

Techniques are provided which may be implemented in various methods, apparatus, and/or articles of manufacture to allow a mobile device to obtain certain location service(s) and/or the like from one or more computing devices that have been authorized for use. For example, in certain implementations, an authorizing location server may obtain a first message from a mobile device indicating a first set of location servers, determine a second set of location servers based, at least in part, on the first set of location servers, and transmit a second message to the mobile device indicating that the second set of location servers are authorized for location service related access by the mobile device.

61 Claims, 11 Drawing Sheets

Related U.S. Application Data on Mar. 9, 2011, provisional application No. 61/470,986, filed on Apr. 1, 2011, provisional application No. 61/484,113, filed on May 9, 2011, provisional application No. 61/485,085, filed on May 11, 2011, provisional application No. 61/495,895, filed on Jun. 10, 2011, provisional application No. 61/527,841, filed on Aug. 26, 2011.

(51) Int. Cl.
| | | |
|---|---|---|
| H04L 29/08 | (2006.01) | |
| H04W 12/08 | (2009.01) | |
| H04W 4/20 | (2009.01) | |
| H04W 76/00 | (2009.01) | |

(56) References Cited

U.S. PATENT DOCUMENTS

| | | |
|---|---|---|
| 7,729,706 B2 | 6/2010 | Kim et al. |
| 7,900,039 B2 | 3/2011 | Shim et al. |
| 7,929,965 B2 | 4/2011 | Shim et al. |
| 8,068,056 B2 | 11/2011 | Wachter et al. |
| 8,392,980 B1 | 3/2013 | Ahrens et al. |
| 8,627,422 B2 | 1/2014 | Hawkes et al. |
| 2003/0172278 A1 | 9/2003 | Farnham et al. |
| 2004/0059941 A1 | 3/2004 | Hardman et al. |
| 2005/0015595 A1 | 1/2005 | Edwards et al. |
| 2005/0108520 A1 | 5/2005 | Yamamoto et al. |
| 2005/0125493 A1 | 6/2005 | Chaskar et al. |
| 2006/0058042 A1 | 3/2006 | Shim |
| 2006/0143705 A1 | 6/2006 | Sentoff |
| 2006/0242404 A1 | 10/2006 | Su |
| 2006/0246919 A1 | 11/2006 | Park et al. |
| 2007/0060097 A1 | 3/2007 | Edge et al. |
| 2007/0135089 A1 | 6/2007 | Edge et al. |
| 2007/0238458 A1 | 10/2007 | Shim |
| 2007/0286212 A1 | 12/2007 | Kim et al. |
| 2007/0287448 A1 | 12/2007 | Kim et al. |
| 2008/0031194 A1 | 2/2008 | Yaqub |
| 2008/0045237 A1 | 2/2008 | Yan |
| 2008/0109650 A1 | 5/2008 | Shim et al. |
| 2008/0133762 A1 | 6/2008 | Edge et al. |
| 2008/0228654 A1 | 9/2008 | Edge |
| 2008/0233931 A1 | 9/2008 | Shim |
| 2008/0254809 A1 | 10/2008 | Kraufvelin et al. |
| 2009/0104904 A1 | 4/2009 | Shim |
| 2009/0181698 A1 | 7/2009 | Farmer et al. |
| 2009/0209232 A1 | 8/2009 | Cha et al. |
| 2009/0209269 A1 | 8/2009 | Shim et al. |
| 2010/0257366 A1 | 10/2010 | LeClercq et al. |
| 2010/0311439 A1 | 12/2010 | Thomson et al. |
| 2010/0325702 A1 | 12/2010 | Su |
| 2011/0035788 A1 | 2/2011 | White et al. |
| 2011/0136472 A1 | 6/2011 | Rector et al. |
| 2011/0264780 A1 | 10/2011 | Reunamaeki et al. |
| 2012/0173613 A1 | 7/2012 | Bryan |
| 2012/0202447 A1 | 8/2012 | Edge et al. |
| 2012/0202517 A1 | 8/2012 | Edge et al. |
| 2013/0067552 A1 | 3/2013 | Hawkes et al. |
| 2013/0283352 A1 | 10/2013 | Edge et al. |
| 2014/0093081 A1 | 4/2014 | Hawkes et al. |
| 2014/0094147 A1 | 4/2014 | Hawkes et al. |

FOREIGN PATENT DOCUMENTS

| | | |
|---|---|---|
| CN | 101346000 A | 1/2009 |
| JP | 2008536377 A | 9/2008 |
| JP | 2009517916 A | 4/2009 |
| JP | 2010509889 A | 3/2010 |
| TW | 201041359 A | 11/2010 |
| WO | WO-2007016695 | 2/2007 |
| WO | WO-2008112819 A2 | 9/2008 |

OTHER PUBLICATIONS

International Preliminary Report on Patentability—PCT/US2011/059455, The International Bureau of WIPO—Geneva, Switzerland—May 16, 2013.
International Search Report and Written Opinion—PCT/US2011/059455—ISA/EPO—Mar. 21, 2012.
International Search Report and Written Opinion—PCT/US2012/024003—ISA/EPO—May 24, 2012, 11 pages.
International Search Report and Written Opinion—PCT/US2012/024007—ISA/EPO—May 24, 2012.
Lee Hunter: "Emergency location for emergency call", Feb. 1, 2010, pp. 1-10, XP55026935, Retrieved from the Internet: URL:http://member.openmobilealliance.org/ftp/Public documents/LOC/2010/OMA-LOC-2010-0032_INP_SUPL3_0_emergency_location_for_emergency_call.zip [retrieved on May 11, 2012] pp. 5-9.
Open Mobile Alliance: "Secure User Plane Location Architecture, Draft Version 3.0", Jan. 3, 2011, pp. 1-40, XP55026688, Retrieved from the Internet: URL:http://member.openmobilealliance.org/ftp/Public documents/LOC/Permanent documentS/OMA-AD-SUPL-V3_0-20110103-D.zip [retrieved on May 9, 2012 paragraph [5.2.2.1.1]; figure 1 paragraph [0B.5]; figure 11.
Open Mobile Alliance: "Enabler Release Definition for Secure User Plane Location (SUPL) Candidate Version 3.0 OMA-ERELDSUPL-V3_0-20100921-D", Sep. 21, 2010, XP55019138, pp. 1-17.
Open Mobile Alliance: "User Plane Location Protocol Candidate Version 2.0", OMA-TSULP—V2_0-20100816-C, Aug. 16, 2010, XP55019043, pp. 1-410.
Tcs Systems: "SLP Discovery Models and Mechanisms", Dec. 15, 2010, pp. 1-11, XP55026932, Retrieved from the Internet: URL:http://member.openmobilealliance.org/ftp/Public documents/LOC/2010/OMA-LOC-2010-0316-INP_SUPL_3_0_TCS_SLP_Models_and_Discovery_Mechanisms.zip [retrieved on May 11, 2012] pp. 1-6, 10.
"User Plane Location Protocol, Draft Version 3.0—Nov. 22, 2010", Nov. 22, 2010, pp. 1-185, XP55026734, Retrieved from the Internet: URL:http://member.openmobilealliance.org/ftp/Public documents/LOC/Permanent_documents/OMA-TS-ULP-V3_0-20101122-D.zip [retrieved on May 9, 2012] paragraphs [5.1.2] - [5.1.2.2] ; figures 3,4.
Busin A., et al., "SUPL 3.0 AD A012 and A013 Discovery; OMA-LOC-2011-0023R02-CR_SUPL3_0_AD_A012_A0 13 Discovery", OMA-LOC-2011-0023R02-CR SUPL3_0_AD_A012_AO 13 Discovery, Open Mobile Alltance (OMA), 4330 La Jolla Village Dr., Suite 110 San Diego, CA 92122 ; USA, Jan. 31, 2011, pp. 1-4, XP064090897 , Retrieved from the Internet: URL:http://member.openmobilealliance.org/ftp/Public_documents/LOC/2011/ [retrieved on Feb. 9, 2011] * paragraphs [Title], [5.2.2.1.1], [5. 3 .1. X]* .
European Search Report—EP14160847—Search Authority—Munich—May 19, 2014.
Goze T. et al., "Secure User-Plane Location (SUPL) Architecture for Assisted GPS (A-GPS)", Piscataway, NJ, USA, XP031393759, ISBN: 978-1-4244-2160-2.
Ikegami T., et al., "Undoable Management User Interface for System Reliability", Technical Report of the IEICE, Japan, The Institute of Electronics, Information and Communication Engineers (IEICE), Nov. 12, 2004, vol. 2004, No. 115, pp. 79-86.
Open Mobile Alliance, "UserPlane Location Protocol", Open Mobile Alliance, Jun. 27, 2008, Version 2.0, OMA-TS-ULP-V2_0-20080627-C, p. 24-26, 203-215, 223-249, 397-399, [retireved on Mar. 23, 2015]. Retrieved from the Internet, URL, <http://www.natisbad.org/N900/ref/supl/OMA-TS-ULP-V2_0-20080627-C.pdf>.
Taiwan Search Report—TW101103815—TIPO—Apr. 13, 2015.
Takahashi M., et al., "Technology Reports: Development of FOMA Location Information Functions Using SUPL International Roaming—Location Positioning Function—," NTT Docomo Technical Journal, Japan, the Telecommunications Association, Jul. 1, 2009, vol. 17, No. 2, pp. 6-10.

METHODS AND APPARATUS FOR IDENTIFYING AND AUTHORIZING LOCATION SERVERS AND LOCATION SERVICES

CLAIM OF PRIORITY

This application is a Continuation of U.S. patent application Ser. No. 13/366,308, filed Feb. 4, 2012, titled, "METHODS AND APPARATUS FOR IDENTIFYING AND AUTHORIZING LOCATION SERVERS AND LOCATION SERVICES", which claims the benefit from and priority under 35 USC 119 to the following U.S. Provisional Application applications: Ser. No. 61/440,251, filed Feb. 7, 2011, titled, "SUPPORT OF A SUPL DISCOVERED SLP (D-SLP)"; Ser. No. 61/451,059, filed Mar. 9, 2011, titled, "METHODS AND APPARATUS FOR SUPPORT OF A SUPL DISCOVERED SLP (D-SLP)"; Ser. No. 61/470,986, filed Apr. 1, 2011, titled, "METHODS AND APPARATUS FOR SUPPORT OF A SUPL DISCOVERED SLP (D-SLP)"; Ser. No. 61/484,113, filed May 9, 2011, titled, "METHODS AND APPARATUS FOR SUPPORT OF A SUPL DISCOVERED SLP (D-SLP)"; Ser. No. 61/485,085, filed May 11, 2011, titled, "METHODS AND APPARATUS FOR SUPPORT OF A SUPL DISCOVERED SLP (D-SLP)"; Ser. No. 61/495,895, filed Jun. 10, 2011, titled, "METHODS AND APPARATUS FOR SUPPORT OF A SUPL DISCOVERED SLP (D-SLP)"; and Ser. No. 61/527,841, filed Aug. 26, 2011, titled, "METHODS AND APPARATUS FOR SUPPORT OF A SUPL DISCOVERED SLP (D-SLP)", wherein the non-provisional patent application and each of the provisional patent applications are assigned to the assignee here of and are incorporated in their entirety herein by reference.

BACKGROUND

1. Field

The subject matter disclosed herein relates to electronic devices, and more particularly to methods, apparatus and articles of manufacture for use in identifying and/or accessing one or more authorized location servers and/or one or more location services.

2. Information

Mobile devices, such as mobile phones, notebook, computers, etc., typically have the ability to estimate their location and/or position with a high degree of precision using any one of several technologies such as, for example, satellite positioning systems (e.g., GPS, Galileo, Glonass and the like), advanced forward link trilateration (AFLT), Cell ID or Enhanced Cell ID just to name a few examples. Location or position estimation techniques typically involve the processing of measurements which may be based on signals acquired at a mobile device receiver. For example, a mobile device may acquire satellite positioning system (SPS) signals or a pilot signals transmitted from a terrestrial base station. Various measured characteristics of the acquired signals such as phase, signal strength, time of arrival, and/or round trip delay may be used in computing a position fix.

In a particular implementation, User Plane (UP) positioning such as SUPL (Secure User Plane Location) as set forth by the Open Mobile Alliance (OMA) in publicly available documents describe a framework within which location estimates obtained at a mobile device (e.g. a SUPL Enabled Terminal (SET)) or at a separate location server (e.g. SUPL Location Platform (SLP)) may be made available to other entities as part of a location service. Making these location estimates available to other entities may be useful in particular applications such as, for example, providing emergency services, locating a user on behalf of another client user, obtaining driving directions or finding a nearby gas station, hotel, airport or hospital. Additionally, in certain instances a mobile device may also communicate with an SLP to obtain positioning assistance data such as, for example, a rough location, accurate time reference, data to assist in acquisition of SPS or terrestrial radio signals, local indoor navigation assistance data, SPS ephemeris data to assist in computing a location from SPS measurements, just to name a few examples of positioning assistance data.

A location estimate may be referred to as a location, estimated location, position or position estimate—these terms being used synonymously herein.

In certain instances, an external client may comprise a SUPL Agent. A SUPL Agent may indirectly acquire an estimated location of a SET from the mobile device. For example, to acquire an estimated location of a mobile device, a SUPL Agent may transmit a message to an SLP requesting the estimated location. After receiving the message from the SUPL Agent, the SLP may initiate a SUPL session with the mobile device to obtain an estimated location of the mobile device, which may subsequently be transmitted from the SLP to the SUPL Agent. The estimated location may typically be obtained in one of two ways—either (i) where the mobile device makes measurements (e.g. of SPS signals and/or terrestrial radio signals from nearby base stations and/or other wireless access points) and transfers the measurements to the SLP for the SLP to compute the estimated location or (ii) where the mobile device makes measurements as in (i) and in addition computes the estimated location itself, possibly making used of assistance data (e.g. SPS ephemeris data) provided by the SLP in order to do this.

In one particular example, a mobile device may be associated with a home location server such as a home SLP (H-SLP) having location assistance data that is generally applicable to regions where the user device may be located at any particular time. Here, regardless of a current location of the mobile device, the mobile device may communicate with its H-SLP to obtain various location services, positioning assistance data, location based service information, etc.

In certain situations, however, an H-SLP may not have a particular location service and/or certain desired positioning assistance data, etc., for a mobile device to use in obtaining navigation assistance. For example, if the mobile device is located inside a building structure such as a shopping mall, airport, civic center or hospital (to name just a few examples), the H-SLP may be able to provide assistance data related to nearby base stations external to the building structure and to certain SPSs, but may not have information on wireless access points inside the building structure such as Wireless LAN Access Points or Femtocells. In that case, it may not be possible to obtain an accurate location estimate for the mobile device—e.g. if the mobile device can measure signals from the wireless access points inside the building structure but due to signal attenuation and reflection caused by the building structure, is unable to measure or accurately measure signals from SPS satellites and external base stations. In certain other cases, the H-SLP may not know about base stations nearby to the mobile device (e.g. if the mobile device is in a country or region remote from the H-SLP) making location estimation difficult or impossible even when the mobile device is outdoors and not within a building structure. Thus, it may be beneficial for a mobile device to be able to obtain certain location service(s), positioning assistance data, location based service information, etc., in some other manner.

In still other situations, it may be that given a location of a mobile device and/or current operations of an H-SLP, that the H-SLP may be unable to assist in providing a particular location service, etc., in some adequate and/or timely manner. Thus it may be beneficial for a mobile device to be able to obtain certain location service(s), a positioning assistance data, location based service information, etc., in some other manner.

SUMMARY

In accordance with one aspect, a method may be provided for use by one or more computing devices in providing an authorizing location server. The method may, for example, comprise: obtaining a first message from a mobile device, said first message indicating a first set of location servers; determining a second set of location servers based, at least in part, on said first set of location servers; and transmitting a second message to said mobile device, said second message indicating said second set of location servers as being authorized for location service related access by said mobile device.

In accordance with another aspect, a method may be provided for use by a mobile device. The method may, for example, comprise: transmitting a first message to an authorizing location server, said first message indicating a first set of location servers; obtaining a second message from said authorizing location server, said second message indicating a second set of location servers as being authorized for location service related access by said mobile device; and accessing one or more location servers from said second set of location servers for one or more location services.

In accordance with yet another aspect, an apparatus may be provided for use in an authorizing location server. The apparatus may, for example, comprise: means for obtaining a first message from a mobile device, said first message indicating a first set of location servers; means for determining a second set of location servers based, at least in part, on said first set of location servers; and means for transmitting a second message to said mobile device, said second message indicating said second set of location servers as being authorized for location service related access by said mobile device.

In accordance with still another aspect, an apparatus may be provided for use in a mobile device. The apparatus may, for example, comprise: means for transmitting a first message to an authorizing location server, said first message indicating a first set of location servers; means for obtaining a second message from said authorizing location server, said second message indicating a second set of location servers as being authorized for location service related access by said mobile device; and means for accessing one or more location servers from said second set of location servers for one or more location services.

In accordance with certain other aspects, an authorizing location server may be provided which may, for example, comprise: a network interface; and one or more processing units to: obtain a first message from a mobile device via said network interface, said first message indicating a first set of location servers; determine a second set of location servers based, at least in part, on said first set of location servers; and initiate transmission of a second message to said mobile device via said network interface, said second message indicating said second set of location servers as being authorized for location service related access by said mobile device.

In accordance with certain further aspects, a mobile device may be provided which may, for example, comprise: a wireless interface; and one or more processing units to: initiate transmission of a first message to an authorizing location server via said wireless interface, said first message indicating a first set of location servers; obtain a second message from said authorizing location server via said wireless interface, said second message indicating a second set of location servers as being authorized for location service related access by said mobile device; and access, via said wireless interface, one or more location servers from said second set of location servers for one or more location services.

In accordance with still other aspects, an article of manufacture may be provided which may, for example, comprise: a non-transitory computer readable medium having stored therein computer implementable instructions that are executable by one or more processing units of an authorizing location server to: obtain a first message from a mobile device, said first message indicating a first set of location servers; determine a second set of location servers based, at least in part, on said first set of location servers; and initiate transmission of a second message to said mobile device, said second message indicating said second set of location servers as being authorized for location service related access by said mobile device.

In accordance with certain further aspects, an article of manufacture may be provided which may, for example, comprise: a non-transitory computer readable medium having computer implementable instructions stored therein that are executable by one or more processing units in a mobile device to: initiate transmission of a first message to an authorizing location server, said first message indicating a first set of location servers; obtain a second message from said authorizing location server, said second message indicating a second set of location servers as being authorized for location service related access by said mobile device; and access one or more location servers from said second set of location servers for one or more location services.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
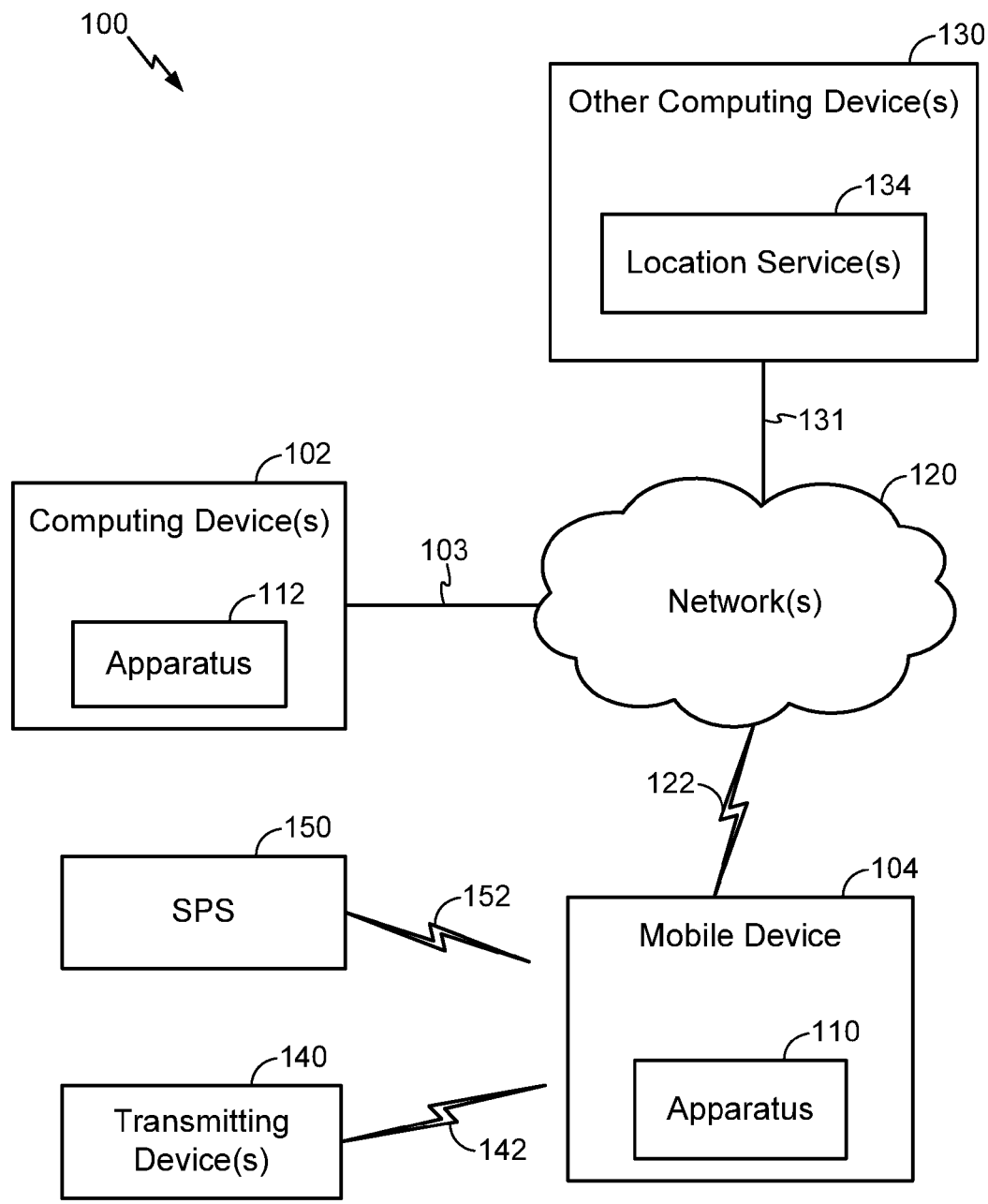
FIG. 1 is a schematic block diagram illustrating an example environment that includes a mobile device for use in accessing certain location services and/or other like information that may be provided by one or more computing devices, in accordance with an implementation.

Various techniques are described herein which may be implemented to allow a mobile device to obtain certain location service(s), etc., from one or more computing devices that have been authorized for use.

In a particular implementation, User Plane (UP) positioning such as SUPL (Secure User Plane Location) as set forth by the Open Mobile Alliance (OMA) provides a framework within which location estimates obtained at a mobile device (e.g. a SUPL Enabled Terminal (SET)) or at a separate location server (e.g. SUPL Location Platform (SLP)) may be made available to other entities as part of a location service. Making these location estimates available to other entities may be useful in particular applications such as, for example, providing emergency services, obtaining driving directions or locating a user on behalf of another client user. Additionally, in certain instances a mobile device may also communicate with an SLP to obtain positioning assistance data to help with acquiring and measuring signals (e.g. from SPS satellites and base stations) and/or to assist in computing a location estimate from such measurements. Examples of positioning assistance data include a rough location estimate for where the mobile device approximately is, an accurate time reference, data to assist in acquisition of SPS signals, SPS ephemeris data, data for individual base stations and/or other wireless access points that may be indoors or outdoors (e.g. location coordinates, signal timing, signal strength, antenna characteristics), just to name a few examples of positioning assistance data.

In one particular example, a mobile device (e.g., a SET) may be associated with a home location server such as a home SLP (H-SLP) having location assistance data that is generally applicable to regions where the user device may be located at any particular time. Here, regardless of a current location of the SET, the SET may usually communicate with its H-SLP to obtain positioning assistance data. Typically, an H-SLP will belong to or be associated with the home wireless network for the SET user and the SET user will have a subscription in the H-SLP for a particular set of location services (e.g. ability to request assistance data or a location estimate from the H-SLP, ability to request the location of another SET, ability to perform location periodically or when entering or leaving a particular geographic area). Thus, the SET will normally expect to communicate with the H-SLP (using SUPL) when it needs a particular location service.

In particular environments, however, an H-SLP may not have the best positioning assistance data for a SET to use in obtaining navigation assistance. In one example, while an H-SLP may have comprehensive assistance data available for outdoor positioning such as SPS or base station almanacs and the like, an H-SLP may not have positioning assistance data for use in an indoor navigation environment (e.g., indoor digital maps and locations, identities and radio characteristics of indoor transmitters. Here, for example, such positioning assistance data applicable for indoor location may instead be available from an SLP other than the H-SLP coupled to the SET. In another example, an H-SLP may not have assistance data applicable to outdoor base stations and other outdoor transmitters when a SET is roaming in a region or country remote from the H-SLP, making even outdoor location problematic.

In one implementation, a SET in communication with its associated H-SLP may discover a local location server (e.g., a discovered SLP (D-SLP)) that is capable of providing location based services to the SET such as particular positioning assistance data, etc., covering an area where the SET is located, and that is not available at the H-SLP. Here, the SET may discover the D-SLP using any one of several techniques such as, for example, acquisition of a broadcasted signal from a local network identifying the D-SLP and describing the D-SLP's capabilities. Alternatively, a network local to the SET may provide the identity and/or address of a D-SLP when the SET attaches for other wireless services (such as making a call or attaching to the Internet) or may provide the D-SLP address and/or D-SLP identity when requested by the SET. Alternatively, the SET may be configured (e.g. by the home network or H-SLP) with the identities and/or addresses of D-SLPs associated with different geographic areas and/or different serving networks. Alternatively, the SET may request a D-SLP address from its H-SLP. In one particular implementation when the SET is able to find or discover a D-SLP address itself (e.g. from a local serving network), the SET may communicate with its H-SLP to seek authorization from the H-SLP as a precondition for accepting or receiving location services, etc., from the D-SLP. In one implementation, an H-SLP may provide authorization to the SET to obtain location services from a D-SLP if a location of the SET is in a region that is serviced by the D-SLP.

In another implementation, an H-SLP may store data that is descriptive of a newly identified D-SLP and/or possibly a newly discovered Emergency SLP (E-SLP) that may support location services for an emergency call made by the SET user. Here, for example, a SET may acquire a broadcasted signal providing an identity of a D-SLP. The SET may then forward the acquired identity of the D-SLP to the H-SLP and receive, for example a summary of capabilities of the D-SLP (e.g., a description of the D-SLP) and an authorization to access and obtain location services from the D-SLP.

A "location" or "location estimate" as referred to herein may refer to information associated with the whereabouts of an object or thing (e.g. a SET) according to a point of reference. Here, for example, such a location may be represented as geographic coordinates such as latitude and longitude. Alternatively, such a location may be represented as a street address, municipality or other governmental jurisdiction, postal zip code and/or the like. However, these are merely examples of how a location may be represented according to particular embodiments and claimed subject matter is not limited in these respects. A SET may estimate its location based at least in part on navigation signals from a Satellite Positioning System (SPS), such as GPS, Galileo or Glonass by, for example, correlating pseudorange measurements from several (e.g., four or more) satellite transmitters. Alternatively, such a location may be estimated from a hybrid system in which a position of a mobile device is determined from a combination of at least: i) a time measurement that represents a time of travel of a message between the mobile device and a communication system (e.g. a base station, Femtocell, Home Base Station, Wireless LAN Access Point); and, ii) a time measurement that represents a time of travel of an SPS signal. Location may also be determined purely from measurements of terrestrial signals (e.g. signal strength and/or signal timing for one or more base stations and Wireless LAN Access Points) as well as from a combination of terrestrial and SPS signal measurements.

In an example implementation, a mobile device may transmit a first message to an authorizing location server such as the H-SLP for the SET indicating a first set of location servers, and in response receive a second message from the authorizing location server indicating a second set of location servers as being authorized for location service related access by the mobile device. The first set of location servers may, for example, identify (i) a set S1 of one or more location servers that the authorizing location server may have previously authorized for the mobile device, (ii) a set S2 of one or more location servers that the mobile device may prefer to be authorized including possibly location servers that the mobile device may have discovered, previously accessed, and/or otherwise become aware of, and (iii) a set S3 of one or more location servers that the mobile device may prefer not to be authorized including possibly location servers that the mobile device either could not access or previously accessed that did not provide adequate service. In some implementations, one or more of the location servers in the set S1 may appear in the set S2 or set S3. However, there may be no location server in the set S1 that appears in both the set S2 and set S3. In certain other instances, the first set of location servers may comprise a null set. The second set of location servers may, for example, identify one or more location servers that the authorizing location server is authorizing for use by the mobile device. In some implementations, the second set of location servers may replace the set of location servers S1 previously authorized by the authorizing location server for use by the mobile device. In certain instances, one or more of the location servers identified in the first set of location servers may also be included in the second set of location servers in the case that the authorizing location server wishes to re-authorize a previously authorized location server. In certain instances, authorization to use one or more location servers in the second set may be conditional, e.g., based on various parameters relating to time, positions, services, etc.

Having obtained the second set of location servers, the mobile device may selectively access one or more of such "authorized" location servers identified therein for one or more location services.

In accordance with certain example implementations, the techniques provided herein may be applied in an environment having an authorizing location server represented by all or part of a Home SUPL Location Platform (H-SLP), all or part of a Discovered SUPL Location Platform (D-SLP), all or part of an Emergency SUPL Location Platform (E-SLP), and/or the like some combination thereof. Further, in certain example implementations a mobile device may comprise a SUPL enabled terminal (SET).

Accordingly, in certain example implementations a first message may comprise a SUPL START message, a SUPL REPORT message, and/or the like, and a second message may comprise a SUPL END message, a SUPL TRIGGERED STOP message, and/or the like. In certain instances, a first message may, for example, further indicate a rough estimated location and/or the like of the mobile device that may be considered by the authorizing location server in identifying one or more location servers to be authorized in the second set of location servers. In certain instances, a first message may, for example, further indicate one or more access networks that may be available for use by the mobile device, which may be considered by the authorizing location server in identifying one or more location servers to be authorized in the second set of location servers. In certain instances, a first message may, for example, further indicate a Quality of Positioning (QoP) parameter and/or the like that may relate to one or more desired location services, and which may therefore be considered by the authorizing location server in identifying one or more location servers to be authorized in the second set of location servers.

In certain other example implementations, a first set of location servers may comprise and/or otherwise identify one or more location servers that were previously authorized for location service related access. In certain example implementations, a first set of location servers may comprise and/or otherwise identify one or more location servers that may or may not be preferable to the mobile device for some reason.

In certain example implementations, a second message may further indicate an access preference (e.g., associated with the authorizing location server) for location services that may be authorized for access via the second set of location servers. In certain example implementations, a second message may further indicate a priority ordering and/or one or more priority parameters that may be considered by the mobile device in selectively accessing one or more location servers in the second set of location servers.

In certain example implementations, a second message may further indicate certain operational and/or conditional information that may be considered by the mobile device in selectively accessing one or more location servers in the second set of location servers. For example, in certain instances a second message may further indicate a service duration, a service area, and/or other like information or some combination thereof that may be applicable to one or more of the authorized location servers in the second set of location servers. For example, in certain instances a second message may further comprise or otherwise indicate all or part of a list of access networks that may be available for use by the mobile device, e.g., one of which should be accessed by the mobile device as a condition for accessing particular authorized location servers. In certain example implementations, a second message may further indicate certain control parameters and/or the like that may be considered by the mobile device in determining whether or not to contact or otherwise access certain location servers. For example, a minimum retry period may indicate a minimum or otherwise expected period of time that should pass before a mobile device retransmits a first message to an authorizing location server.

As mentioned, in certain example implementations, a mobile device may transmit one or more subsequent messages to the authorizing location server indicating that the mobile device has accessed all or part of one or more location services from one or more of the authorized location servers (e.g., in the second set of location servers). By way of some non-limiting examples, a subsequent message may be transmitted in response to the mobile device accessing an authorized location server in the second set of location servers for the first time, and/or for the first time after accessing another location server in the second set of location servers.

Attention is drawn to FIG. 1, which is a schematic block diagram illustrating an example environment 100 that includes a mobile device 104 for use in accessing certain location services 134 and/or other like information that may be provided by one or more computing devices 102/130, in accordance with an implementation. In this example, computing device(s) 102 may be representative of an authorizing location server, and other computing device(s) 130 may be representative of one or more authorized location servers. Although not illustrated in FIG. 1 it should be understood that computing device(s) 102 may comprise one or more location service(s) 134, and/or that that other computing device(s) 130 may comprise an apparatus 112.

With this in mind, as illustrated, mobile device 104 may comprise an apparatus 110 that may be used, at least in part, to initiate transmission of a first message to an apparatus 112 of computing device 102 via one or more network(s) 120. As mentioned, for example, a first message may comprise or otherwise indicate a first set of location servers, and/or other potentially useful information. Apparatus 112 of computing device 102 may, for example, initiate transmission of a second message to apparatus 110 of mobile device 104 via one or more network(s) 120. Again, as previously mentioned a second message may, for example, comprise or otherwise indicate a second set of location servers that may be authorized for access to location services.

In this example, mobile device 104 is illustrated as communicating with network(s) 120 via a wireless communication link 122, and computing device(s) 102 and other computing device(s) 130 are each illustrated as communicating with network(s) 120 via wired communication links 103 and 131, respectively. It should be understood that wired communication links 103 and/or 131 may represent wireless communication links and/or that wireless communication link 122 may represent a wired communication link in certain implementations.

Network(s) 120 may represent one or more communication and/or computing networks, and/or other resources supportive thereof. For example network(s) 120 may comprise one or more telecommunication networks, one or more terrestrial communication networks, one or more cellular communication networks, one or more wired or wireless wide area networks, one or more satellite communication networks, the Internet, and/or the like or some combination thereof. Network(s) 120 may, for example, comprise a plurality of transmitting devices that may support applicable wired and/or wireless communication links. Accordingly, network(s) 120 may comprise various types of access networks with regard to mobile device 104, computing device(s) 102, and/or other computing device(s) 130.

FIG. 1 also illustrates that mobile device 104 may, in certain instances, receive one or more wireless signals 142 from one or more transmitting device(s) 140. Transmitting device(s) 140 may represent one or more transmitting devices associated with all or part of network(s) 120, all or part of one or more location service(s) 134, and/or the like or some combination thereof. Thus for example, transmitting device(s) 140 may represent one or more cellular base stations and/or the like, one or more Wireless Local Area Network (WLAN) access points and/or the like, one or more Home Base Stations and/or the like, one or more location beacons and/or the like, etc. Wireless signal 142 may, for example, represent a wireless signal that may be used, at least in part, in estimating a location of mobile device 104. Similarly, as illustrated in certain example implementations, mobile device 104 may obtain one or more wireless signals 152 from one or more SPS 150. Thus, for example, SPS 150 may represent one or more space-based and/or terrestrial-based transmitting devices associated with a Global Satellite Navigation System (GNSS), and/or the like such as the United States Global Positioning System (GPS), the European Galileo System or the Russian Glonass system. Accordingly, mobile device 104 may in certain circumstances use one or more wireless signals 142 and/or 152 in estimating its location, e.g. using various known techniques.

Figure 2:
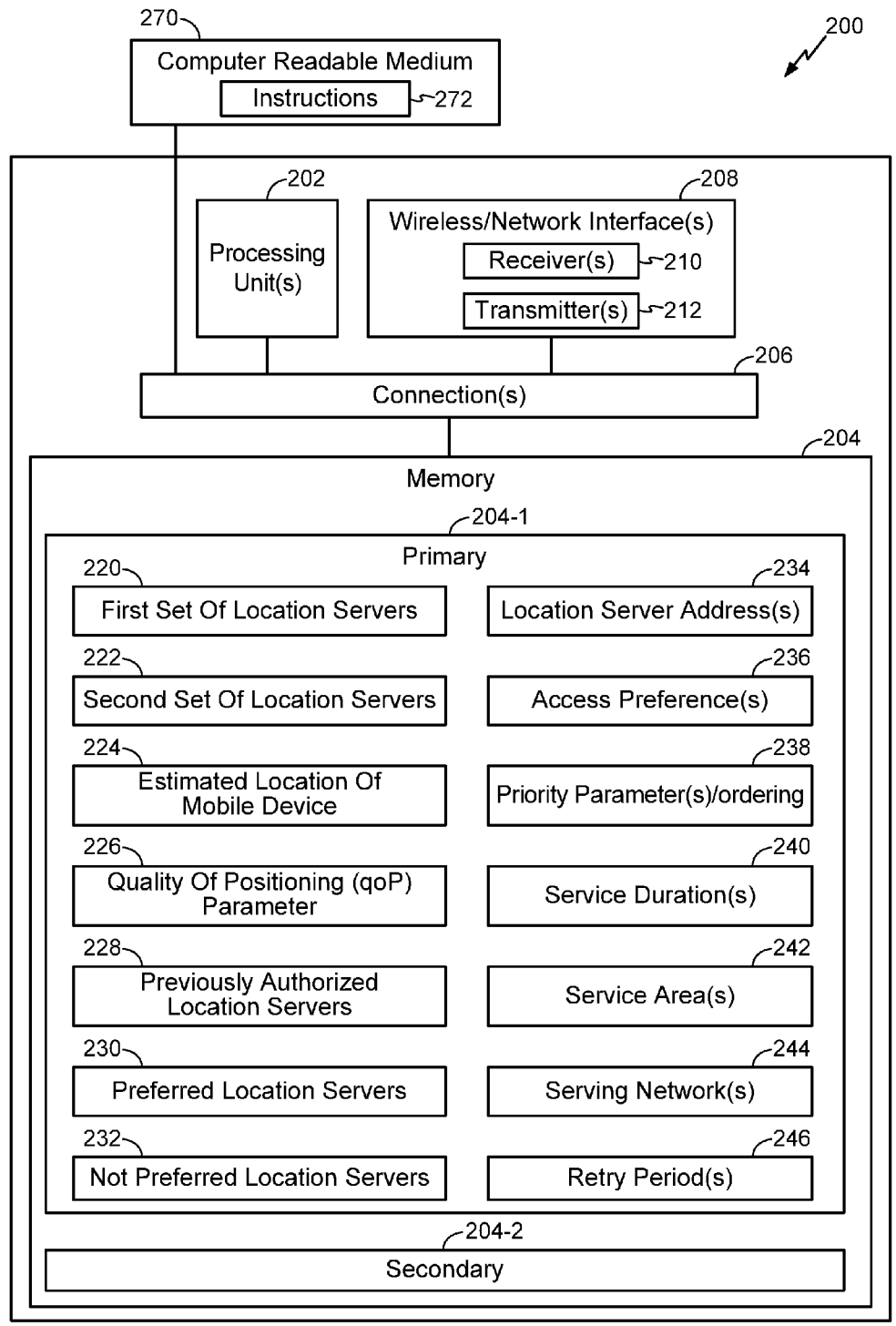
FIG. 2 is a schematic block diagram illustrating certain features of an example computing device that may provide and/or otherwise support certain location services, etc., to one or more other devices, in accordance with an implementation.

Attention is drawn next to FIG. 2, which is a schematic block diagram illustrating certain features of an example computing platform 200 that may be provided as part of computing device(s) 102 and/or as part of other computing device(s) 130, e.g., as in FIG. 1, in accordance with an implementation. Thus, for example, computing platform 200 may comprise apparatus 112, and/or possibly provide and/or otherwise support certain location services 134.

As illustrated, computing platform 200 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 270. Memory 204 and/or computer readable medium 270 may comprise computer-implementable instructions 272 for certain example techniques as provided herein.

As illustrated in FIG. 2, at various times, memory 204 may store certain signals representing data and/or computer-implementable instructions for certain example techniques as provided herein. For example, memory 204 may store data and/or computer-implementable instructions for apparatus 112, and/or location service(s) 134. By way of further example, memory 204 may, at various times, store representative data and/or instructions representing in related to a first set of location servers 220, a second set of location servers 222, an estimated location 224 (e.g., of mobile device 104), a QoP parameter 226, one or more previously authorized location servers 228, one or more preferred location servers 230, one or more not preferred location servers 232, one or more location server addresses 234, one or more access preferences 236, one or more priority parameters and/or a priority ordering 238, one or more serving durations 240, one or more service areas 242, one or more serving networks 244, one or more retry periods 246, and/or the like or some combination thereof.

As shown, computing platform 200 may, for example, comprise one or more wireless/network interface(s) 208. Wireless/network interface(s) 208 may, for example, provide a capability to receive and/or transmit wired and/or wireless signals, e.g., to communicate via network(s) 120 (FIG. 1). Thus, for example, in certain instances wireless/network interface(s) 208 may comprise one or more receivers 210, and/or one or more transmitters 212, as applicable for supporting a particular communication link.

Figure 3:
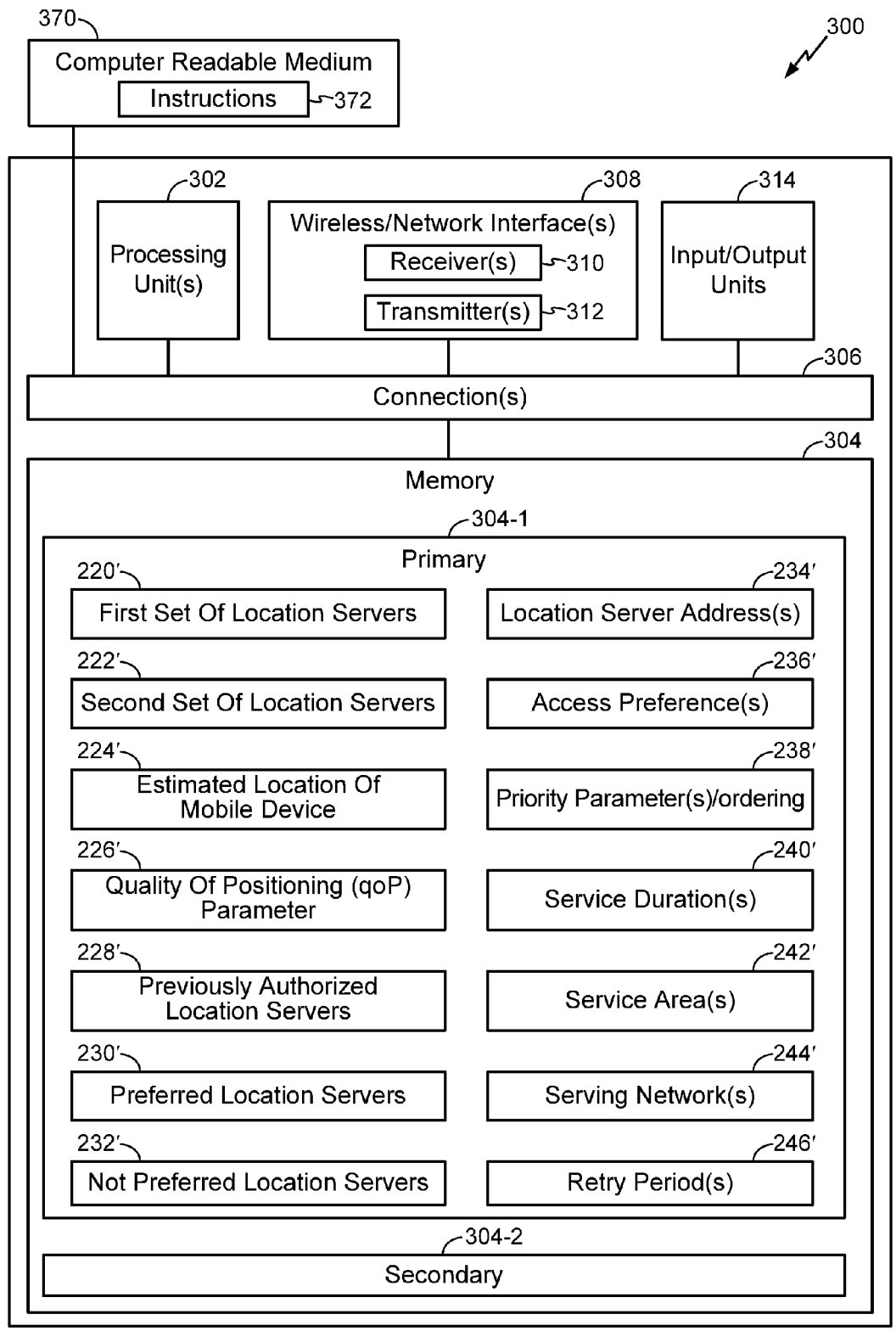
FIG. 3 is a schematic block diagram illustrating certain features of an example mobile device for use in accessing certain location services and/or other like information that may be provided by one or more computing devices, in accordance with an implementation.

Attention is drawn next to FIG. 3, which is a schematic block diagram illustrating certain features of an example computing platform 300 that may be provided by mobile device 104 for use in accessing certain location services 134 and/or other like information that may be provided by one or more computing devices 102/130 (FIG. 1), in accordance with an implementation.

As illustrated, computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 370. Memory 304 and/or computer readable medium 370 may comprise computer-implementable instructions 372 for certain example techniques as provided herein.

As illustrated in FIG. 3, at various times, memory 304 may store certain signals representing data and/or computer-implementable instructions for certain example techniques as provided herein. For example, memory 304 may store data and/or computer-implementable instructions for apparatus 110. By way of example, memory 304 may, at various times, store representative data and/or instructions representing in related to a first set of location servers 220', a second set of location servers 222', an estimated location 224', a QoP parameter 226', one or more previously authorized location servers 228', one or more preferred location servers 230', one or more not preferred location servers 232', one or more location server addresses 234', one or more access preferences 236', one or more priority parameters and/or a priority ordering 238', one or more service durations 240', one or more service areas 242', one or more serving networks 244', one or more retry periods 246', and/or the like or some combination thereof. Although the same reference numbers for certain data items and/or instructions have been used in the preceding examples implementations in FIGS. 2 and 3, such was done simply for readability purposes. Thus, it should be kept in mind that in certain instances one of more such data items and/or instructions may be different. Consequently, example data items and/or instructions illustrated in FIG. 3 are further referenced using a prime symbol to indicate that such data items and/or instructions may be different from similarly referenced data items and/or instructions in FIG. 2.

As shown, mobile device 104 may, for example, comprise a wireless interface 308. Wireless interface 308 may, for example, provide a capability to receive and/or transmit wired and/or wireless signals, e.g., to communicate via network(s) 120, and/or obtain wireless signals 142 one or more transmitter devices 140, and/or obtain wireless signals 152 one or more SPS 150 (FIG. 1). Wireless interface 308 may be comprised of one or more interfaces possibly including but not limited to interfaces for wide area networks (WAN) such as GSM, UMTS, CDMA, LTE, WCDMA and CDMA 2000 and interfaces for personal area networks (PAN) such as WiFi and Bluetooth. It is also understood that there may be multiple wireless interfaces and/or wireline interfaces 308 that may be used simultaneously or individually. Wireless interface 308, may in certain implementations also concurrently and/or alternatively act as a receiver device (and/or transceiver device) to acquire signals 142/152 (FIG. 1) from one or more transmitting devices for use in position location and/or other positioning/navigation services. In certain example implementations, wireless interface 308 may also be representative of one or more wired network interfaces. As illustrated, wireless interface(s) 308 may comprise one or more receivers 310 and/or one or more transmitters 312.

By way of still further example, all or part of wireless interface(s) 308, wired/wireless interface(s) 208, and/or network(s) 120 may be configured for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to Telecommunications Industry Association (TIA) IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, 3GPP Long Term Evolution (LTE), 3GPP LTE Advanced, IEEE 802.16 WiMAX, 3GPP2 Ultra Mobile Broadband (UMB), and/or the like. Additionally, as illustrated the techniques provided herein may also be implemented, at least in part, in an environment that supports SUPL technologies.

As shown, computing platform 300 may comprise one or more input/output units 314. An input/output unit 314 may, for example, comprise one or more user interfaces such as, a keypad, a touch screen, various buttons, various indicators, a display screen, a speaker, a microphone, a projector, a camera, a vibrating mechanism, etc. In certain example implementations, input/output units 314 may comprise one or more inertial sensors (e.g., an accelerometer, gyroscope, etc.), one or more environmental sensors (e.g., a thermometer, a barometer, a magnetometer, etc.).

Computing platform 300 may take the form of a mobile device 104 which is representative of any electronic device that may be moved about within environment 100. For example, mobile device 104 may comprise a hand-held computing and/or communication device, such as, a mobile telephone, a smart phone, a lap top computer, a tablet computer, a positioning/navigation device, tracking device, and/or the like or some combination thereof. In certain example implementations, mobile device 104 may be part of a circuit board, an electronic chip, etc. Mobile device 104 may be referred to as a mobile terminal, terminal, mobile station, mobile equipment or user equipment or by some other name.

Figure 4:
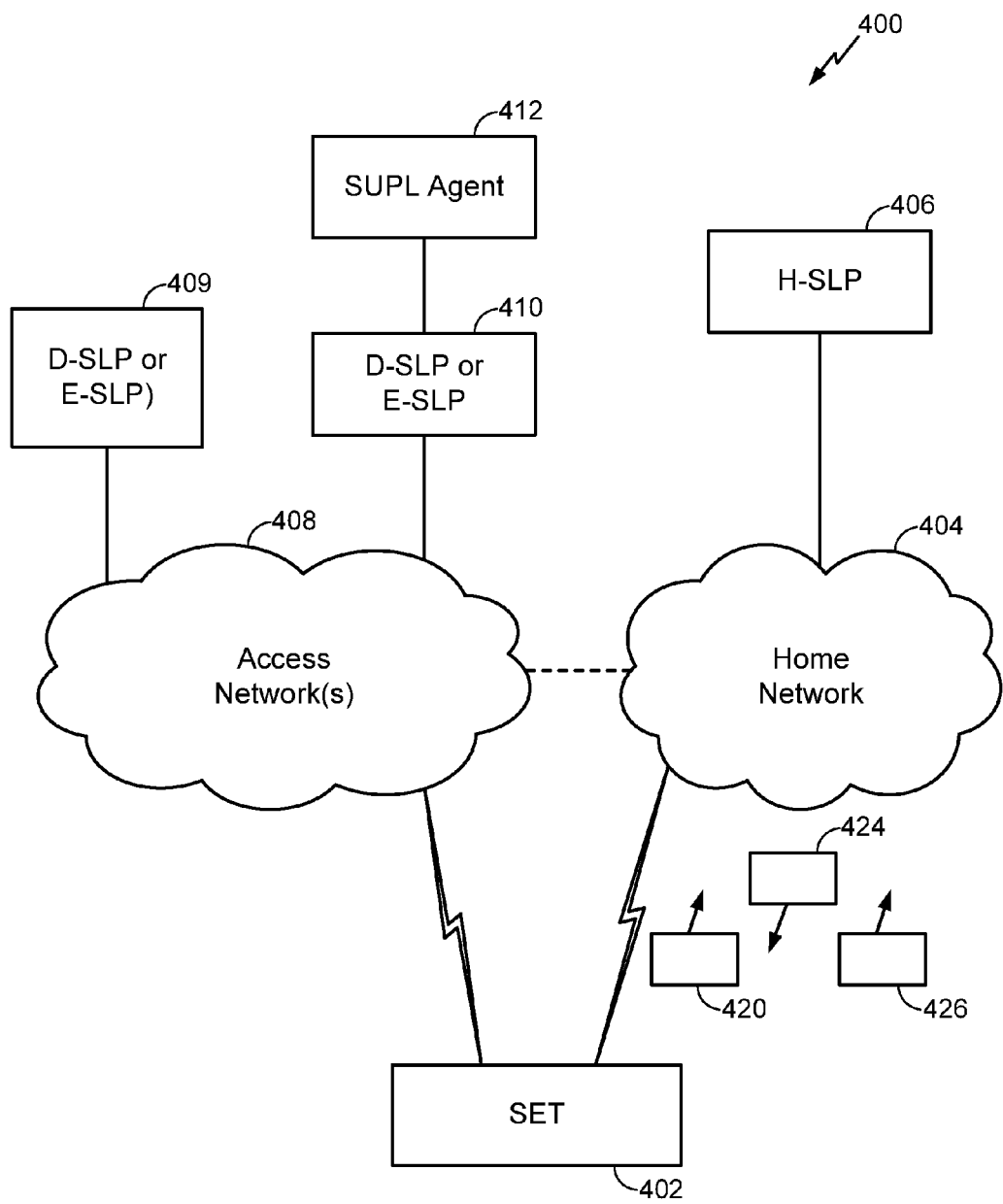
FIG. 4 is a schematic block diagram illustrating an example environment comprising a plurality of SUPL Location Platforms (SLPs) for use with a mobile device represented as a SUPL Enabled Terminal (SET), in accordance with an implementation.

Attention is drawn next to FIG. 4, which is a schematic block diagram illustrating an example environment 400, which may be provided within or as part of environment 100 of FIG. 1, for example. Environment 400 may, for example, be provided to support SUPL technologies using a plurality of SUPL Location Platforms (SLPs) (e.g., 406, 409 and 410) for use with a mobile device represented as a SUPL Enabled Terminal (SET) 402, in accordance with an implementation. As mentioned network(s) 120 of FIG. 1 may comprise one or more networks, which in this example may include a home network 404 for SET 402 and/or one or more access networks 408. One or more networks in access networks 408 may act as a serving network for SET 402 and provide communications services such as an ability to originate and receive voice and data calls, an ability to access the Internet and an ability to connect to SLPs 406, 409 and 410. Home network 404 may be the network in which SET 402 is permanently registered and subscribed for the communication services provided by access networks 408. In some cases, SET 402 may access home network 404 in which case home network 404 becomes one of access networks 408. Although illustrated using separate cloud icons, as illustrated by the interconnecting dashed line home network 404 and one or more access networks 408 may be interconnected and/or otherwise operably communicative in some manner. Home network 404 may or may not share certain common coverage areas with one or more access networks 408 and access networks 408 may or may not share certain common coverage areas with one another. Accordingly, at times, SET 402 may be in a location within a coverage area of certain networks but not others.

SET 402 may correspond to (e.g. be a particular example of) mobile device 104 in FIG. 1. H-SLP 406 may correspond to Computing Device(s) 102 in FIG. 1. D-SLP or E-SLP 409 and D-SLP or E-SLP 410 may correspond to Other Computing Devices 130 in FIG. 1. Access network(s) 408 and home network 404 may correspond to Network(s) 120 in FIG. 1. Although SET 402 is shown in FIG. 4 as having wireless access to both home network 404 and access network(s) 408, SET 402 may, at any particular time, have direct wireless or wireline access only to home network 404 or only to one network in access network(s) 408. In this case, SET 402 may access entities attached to or associated with networks to which SET 402 does not have direct access via communication from access network(s) 408 or home network 404. Such communication may be transferred through other networks not shown in FIG. 4 such as the Internet.

H-SLP 406 may be the SLP with which SET 402 is subscribed to receive location services using SUPL such as transfer of assistance data and determination of SET 402 location. D-SLP or E-SLP 409 and D-SLP or E-SLP 410 may be SLPs able to provide better location services to SET 402 in certain areas than H-SLP 406 and may be authorized to provide such location services as described further down herein.

In this example, SET 402 may transmit a first message 420, e.g., via home network 404 to H-SLP 406. As previously mentioned first message 420 may comprise and/or otherwise identify the first set of location servers. Also as mentioned, in certain instances a first set of location servers may comprise a null set. H-SLP 406 may, for example, determine a second set of location servers based, at least in part, on the first set of location servers. H-SLP 406 may transmit a second message 424, e.g. using home network 404, to SET 402. Here, for example, it will be assumed that second message 424 comprises and/or otherwise identifies a second list of location servers including SLPs 409 and 410, which may be accessible using one or more access networks 408, as being authorized for access by SET 402. In this example, SLP 409 and/or SLP 410 may be representative of a D-SLP and/or an E-SLP and which may be authorized by H-SLP 406.

SET 402, having received authorization to access SLP 410 from H-SLP 406 in the second message 424, may at some later point in time selectively access SLP 410, e.g. to obtain an applicable location services, etc. Thus, for example, one or more SUPL sessions and/or the like may be conducted through which an estimated position of SET 402 may be obtained and/or otherwise selectively provided to a SUPL Agent internal to SET 402 (not shown in FIG. 4) or to an external SUPL agent 412, e.g. via SLP 410 and/or other supporting network(s). When the SUPL Agent is internal to SET 402, SET 402 may initiate the SUPL session with SLP 410 to obtain the location estimate and SET 402 may need to verify that the particular location service (e.g. obtaining the location estimate for the internal SUPL Agent) was authorized for SLP 410 by H-SLP 406. When a location estimate is provided instead to an external SUPL Agent 412, SLP 410 may initiate the SUPL session with SET 402 (in order to obtain the location estimate) and SET 402 may need to verify that the particular location service (e.g. obtaining a location estimate on behalf of an external SUPL Agent) was authorized by H-SLP 406.

In accordance with certain implementations, SET 402 having accessed SLP 409 and/or SLP 410 (e.g. for the example service described above), may communicate that such authorized access occurred using one or more subsequent messages 426, which may be transmitted via one or more access networks 408 and/or via home network 404 to H-SLP 406.

Figure 5:
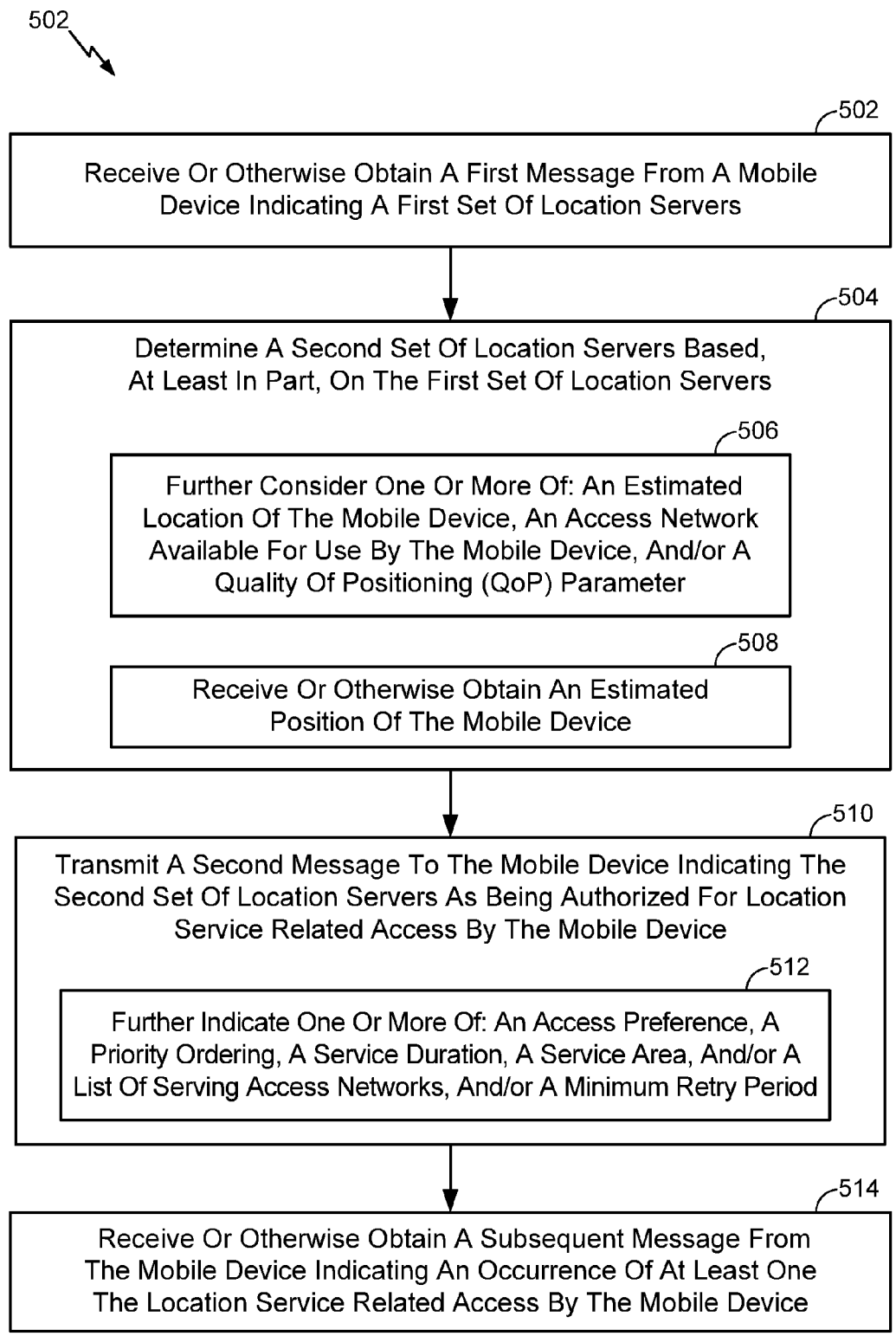
FIG. 5 is a flow diagram illustrating certain features of a process or method for a computing device, e.g., as in FIG. 2, in accordance with an implementation.

Attention is drawn next to FIG. 5, which is a flow diagram illustrating certain features of a process or method 500 for a computing device 102, e.g., as in FIG. 1, and/or a H-SLP 406, e.g., as in FIG. 4, in accordance with an implementation.

At example block 502, a first message may be obtained by a location server (e.g. an authorizing location server) from a mobile device. Here, for example, the first message may comprise or otherwise indicate a first set of location servers. As mentioned, however in certain instances a first set of location servers may comprise a null set. It should be understood that in certain instances a first message as used herein may comprise one or more transmitted messages.

At example block 504, a second set of location servers may be determined based, at least in part, on the first set of location servers. In certain example implementations, at block 506, a determination at block 504 may further consider additional information, such as, for example estimated location of a mobile device, one or more access network(s) available for use by mobile device, a QoP parameter, an access preference, a priority parameter, a service duration, a service area, and/or the like or some combination thereof. In certain instances, at block 508, an estimated position of the mobile device may be obtained.

At example block 510, a second message may be transmitted to a mobile device indicating the second set of location servers as being authorized for location service related access by the mobile device. In certain example implementations, at block 512, a second message may further indicate access preference, a priority ordering, a service duration, a service area, certain access networks, a minimum retry period, and/or the like or some combination thereof. It should be understood that in certain instances a second message is used herein may comprise one or more transmitted messages.

At example block 514, a subsequent message may be obtained from a mobile device indicating an occurrence of at least one location service related access of an authorized location server by a mobile device.

Figure 6:
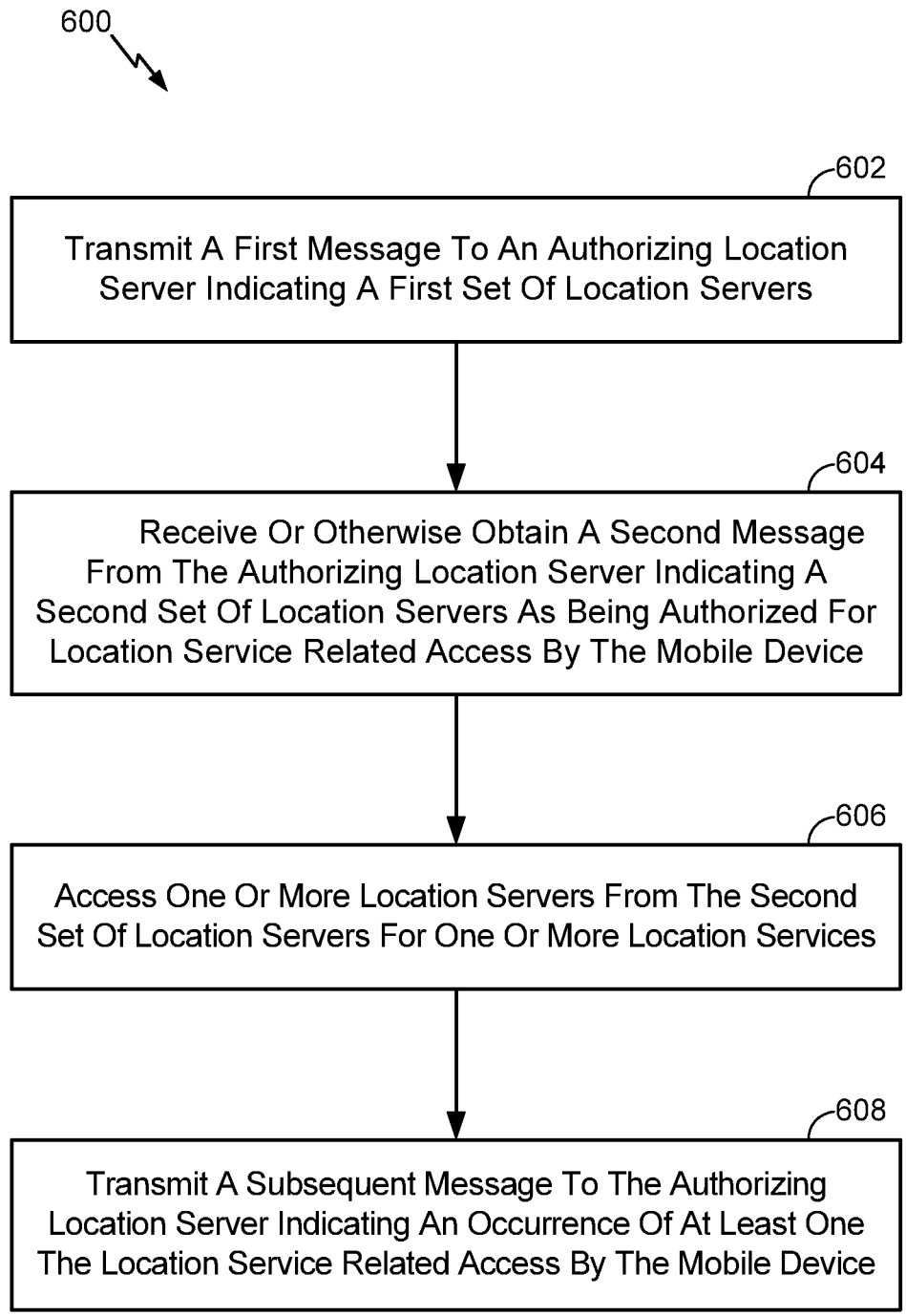
FIG. 6 is a flow diagram illustrating certain features of a process or method for a mobile device, e.g., as in FIG. 3, in accordance with an implementation.

Attention is drawn next to FIG. 6, which is a flow diagram illustrating certain features of a process or method 600 for a mobile device 104, e.g., as in FIG. 1, and/or a SET 402, e.g., as in FIG. 4, in accordance with an implementation.

At example block 602, a first message may be transmitted to an authorizing location server (e.g. H-SLP 406 in FIG. 4) indicating a first set of location servers. In certain implementations, a first set of location servers may comprise a null set. Further, in certain implementations, a first message may comprise additional information that may be considered by the authorizing location server. As used herein such a first message may comprise one or more transmitted messages.

At example block 604, a second message may be obtained from the authorizing location server indicating a second set of location servers as being authorized for location service related access by the mobile device. As used herein such a second message may comprise one or more transmitted messages.

At example block 606, one or more location servers from the second set of location servers may be selectively accessed by the mobile device for one or more location services, and/or other like from information.

At example block 608, a subsequent message may be transmitted to the authorizing location server by the mobile device indicating an occurrence of at least one location service related access of an authorized location server by the mobile device. As used herein, such a subsequent message may comprise one or more transmitted messages.

It is contemplated that discovery of an SLP (e.g., a D-SLP and/or E-SLP) may occur in a number of different ways, including but not limited to digital discovery by a user (e.g. via web surfing, scanning a QR code, etc.). Discovery may also come from or otherwise be supported by an H-SLP. For example, an H-SLP may: provide a D-SLP address or other like identifier when queried by the SET; redirect a SET to a D-SLP; translate and/or verify a D-SLP address or other like identifier already discovered by the SET, e.g. via a query/response mechanism. In certain instances, discovery may come from or otherwise be supported by one or more resources of an Access Network. For example, an Access Network may provide a D-SLP address or other like identifier when a user attaches (e.g., using an LTE Attach Accept message) and/or may allow a SET to query for this via the Internet Engineering Task Force (IETF) Dynamic Host Configuration Protocol (DHCP) and/or the like. In another example, a fixed format D-SLP address and/or the like identifier associated with an access network (e.g. containing a mobile country code identifier and mobile network code identifier for the access network) may also be defined similar to that for a default E-SLP address in SUPL for discovery via the IETF Domain Name System (DNS) procedure and/or the like.

An address of a D-SLP or E-SLP that is discovered by a SET and/or authorized by an H-SLP may be a globally unique address like a Fully Qualified Domain Name (FQDN) or may be an IP address or may be an address specific to a particular (e.g. known or default) network or communications technology.

The previous methods may also be used to discover or verify an E-SLP address ahead of a possible emergency call. Hence, for example, one may consider treating a D-SLP and an E-SLP as different variants of a local SLP. As such, a local SLP may then function as a D-SLP or E-SLP or both.

Techniques provided herein may also provide for additional H-SLP support. For example, in verifying or providing an address or the like identifier of an authorized D-SLP, an H-SLP may provide for certain restrictions, e.g., to further protect the SET user. For example, a period of time during which the SET can access a D-SLP may be provided. For example, a geographic area or like set of areas within which the SET must reside in order to access a D-SLP may be provided. For example, one or more access networks from which a SET may access a D-SLP may be provided. For example, a set of services that a D-SLP is allowed to provide (e.g., other services may be rejected by the SET if network initiated) may be identified. If one or more of such provided example conditions no longer apply, a SET may request a new D-SLP address for the like identifier from the H-SLP, and/or possibly be provided with a new D-SLP address. In certain instances, an H-SLP may provide information to the SET user on a degree of privacy to expect from a D-SLP—e.g., which may identify location services and/or other like information which may or may not be allowed by local regulations.

Certain techniques provided herein may further benefit an H-SLP or otherwise provide for additional control thereof. For example, an H-SLP may provide or verify a D-SLP address or other like identifier to a SET while the SET is roaming in an area where the H-SLP cannot adequately support location (e.g. in a foreign country or in enclosed area where the home operator does not have good coverage). For example, an H-SLP may provide or verify a D-SLP address or other like identifier to a SET should a home operator partner with a group of other operators such that each operator provides location support within its own coverage area for the subscribers of all operators. Further, in certain instances, an H-SLP may control a length of time that a SET may access a D-SLP, a geographic area within which access is permitted, and/or a set of access networks from which access may be allowed. Additionally, in certain instances, an H-SLP may query a SET to verify if a D-SLP has been authorized for the SET and possibly revoke permission to access such D-SLP—e.g., if the D-SLP was assigned before an H-SLP went out of service but the H-SLP is now back in service.

Certain techniques provided herein may allow for certain security techniques to be applied. For example, in certain implementations, a public key certificate may be used by a SET to authenticate a D-SLP as for an H-SLP. For example, doing so may help to verify that a D-SLP owns an address that was provided or verified by the H-SLP, and/or otherwise establish a trustworthiness of a D-SLP by way of the H-SLP. In another example, if a D-SLP provider has a relationship with a 3GPP/3GPP2 H-SLP provider, a D-SLP may use the 3GPP Generic Bootstrapping Architecture (GBA) method to authenticate the SET. In other examples, a D-SLP may use client side device certificates (as for an H-SLP) to authenticate the SET, e.g., using the same or similar methods as for an H-SLP to bind the user and device identities. In still other example implementations, the SUPL Alternative Client Authentication (ACA) may be used by a D-SLP to verify a SET IP address matches a known SET identity if the D-SLP belongs to or is associated with an access network provider. Moreover, D-SLP security may use the same methods as an H-SLP.

The techniques provided herein may further enhance certain services and/or billing relating to a D-SLP which may support SET initiated location services. For example, a D-SLP provider may bill the SET user directly. For example, billing may be provided or otherwise supported via an H-SLP provider, e.g., if there is a business relationship and the D-SLP can authenticate the SET identity (e.g. the SET International Mobile Subscriber Identity (IMSI)). In certain implementations, network (e.g. SLP) initiated location might be permitted if notification and verification to the SET are used, e.g., such implementations may be useful for network applications and/or services that assist the SET user in some manner. For example, an external SUPL Agent may be billed (e.g. by a D-SLP provider) for locating a SET, wherein the SUPL Agent provider may transfer the charges to the SET user via billing for services provided to the user (e.g. navigation assistance) as a consequence of obtaining the SET location. Still other example limitations, a network initiated location fix may be allowed for a D-SLP that also functions as an E-SLP to possibly support location estimation for an emergency call. Here, for example, in the resulting billing may depend on applicable regulatory requirements, and/or other like agreements.

The following sections provide additional examples of the techniques presented herein with regard to certain protocol implementations identified by OMA for Location Based Services over the User Plane called SUPL. SUPL may, for example, enable SETs and SLPs to communicate over an IP bearer to exchange location information (e.g., GNSS assistance data, etc.) and other information that may be useful for positioning. More specifically, certain example message flows are described which may be implemented in whole or in part in the example implementations presented in FIGS. 1-6.

The message flows described below illustrate how different location services and/or the like may be provided to a SUPL Agent and/or the like through certain example interactions between a SUPL Agent, one or more SLPs and one or more SETs. In accordance with certain example implementations, messages transmitted between an SLP and a SET over an access network and/or network may, for example, be compliant with a SUPL Userplane Location Protocol (ULP), e.g., ULP 3.0, and/or some other like protocol. In accordance with certain example implementations, messages transmitted between an SLP and a SUPL agent may, for example, be compliant with a Mobile Location Protocol (MLP) defined by OMA and/or other like protocol. With regard to certain preceding example implementations, in accordance with certain example implementations a first message 420 may comprise a SUPL START message, or a SUPL REPORT message, and/or a second message 424 may comprise a SUPL END message, or a SUPL TRIGGERED STOP message.

Reference will be made to several figures which illustrate message flows and which share a common format in which two or more SUPL entities (e.g., devices, services, etc.) are presented in labeled boxes as corresponding to a specific vertical line. Communication and/or other processing or related thereto are illustrated by a plurality of actions which occur with respect to the vertical lines. The actions are labeled to the leftmost vertical line by way of capital letters presented in alphabetical order. In certain instances, it is expected that the actions correspond to a sequential set of actions. However it may be kept in mind that in certain instances, it may be possible to have a different order and/or for all or part of two or more actions to be performed concurrently. A message from one entity to another may be represented by a line within arrow showing a direction. Such messages may be identified by name and/or listed with certain example parameters, etc., in parentheses associated there with. Additionally, in certain instances further processes and/or potential or specific delays associated there with may be presented in boxes corresponding to applicable vertical lines and hence entities. By way of example, certain delays may be listed by timer values having a "UT#" for SETs, or "ST#" for SLPs, wherein the "#"-sign represents an integer value. Such timer values may vary depending upon certain implementation, and may be set to particular values and a standard. By way of some non-limiting examples, in certain implementations: UT1 and UT2 timer values may have a default value of 11 seconds; UT3, UT5, UT7, UT8, ST1, ST2, ST3, ST4, ST5, ST6, and ST7 timer values may have a default value of 10 seconds; and a UT9 timer value may have a default value of 60 seconds.

In the message flow figures described below, reference to a SET may correspond to SET 402 in FIG. 4, reference to an H-SLP may correspond to H-SLP 406 in FIG. 4, reference to a D-SLP or E-SLP may correspond D-SLP or E-SLP 409 or 410 in FIG. 4 and reference to a SUPL Agent may correspond to SUPL Agent 412 in FIG. 4.

Figure 7:
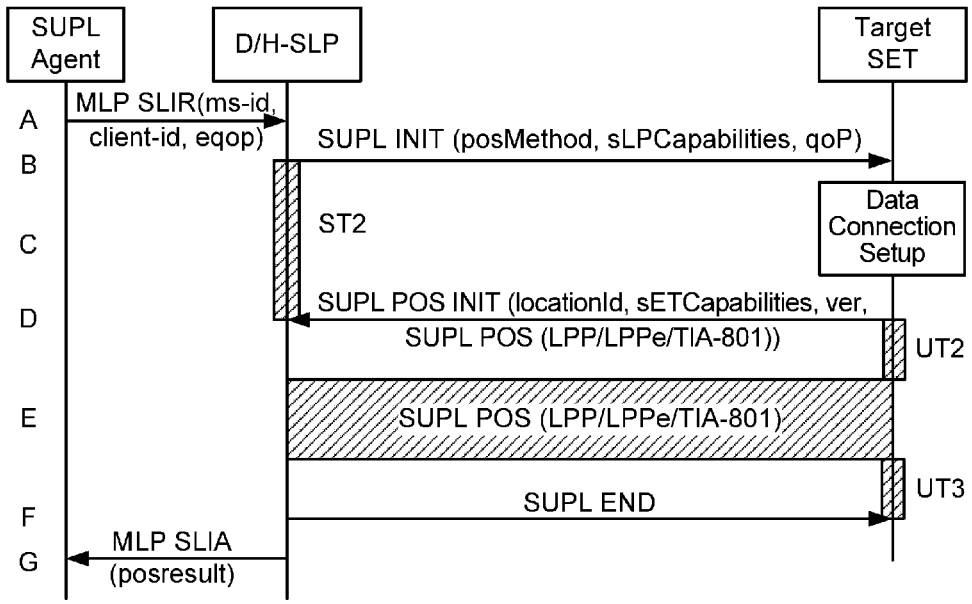
FIG. 7 is a flow diagram illustrating an example message flow that may be used to support certain network initiated location services, in accordance with an implementation.

With this in mind, attention is drawn to FIG. 7, which is a flow diagram illustrating an example message flow that may be used to support certain network initiated location services, in accordance with an implementation. More specifically, FIG. 7 illustrates an example message flow for network initiated (non-roaming) single activity.

At action A: a SUPL Agent sends an MLP SLIR message to either a D-SLP or an H-SLP (collectively referred to herein as the D/H-SLP), with which it is associated to request a location estimate for a particular specified SET. The D/H-SLP may authenticate the SUPL Agent and check if the SUPL Agent is authorized for the service requested based on the client-id for the SUPL Agent that was received. The D/H-SLP may also provide privacy checking based on ms-id and client-id. The D/H-SLP may also verify that a target SET supports SUPL. If a previously computed position which meets the requested QoP (eqop) is available at the D/H-SLP and no notification and verification is desired, the D/H-SLP may directly proceed to action G. If notification and verification or notification only is desired, the D/H-SLP may proceed to action B.

At action B: the D/H-SLP initiates the location session with the SET using the SUPL INIT message. The SUPL INIT message contains the intended positioning method (posMethod), the SLP Capabilities (sLPCapabilities) and optionally the QoP. If the result of the privacy check in action A indicates that notification and/or verification of the target subscriber is needed, the D/H-SLP may also include the Notification parameter in the SUPL INIT message. Before the SUPL INIT message is sent, the D/H-SLP also computes and stores the hash of the SUPL INIT message.

If in action A the D/H-SLP decided to use a previously computed position, the SUPL INIT message may indicate this in a 'no position' posMethod parameter value and the SET may respond with a SUPL END message carrying the results of the verification process (access granted, or access denied). If no explicit verification is desired (notification only) the SET may respond with a SUPL END message. The D/H-SLP may then directly proceed to action G. In certain implementations, before sending the SUPL END message, the SET may perform the data connection setup procedure of action C and use the procedures described in action D to establish a Transport Layer Security (TLS) connection to the D/H-SLP.

At action C: the SET analyses the received SUPL INIT message. If found not to be authentic, the SET takes not further action. Otherwise, the SET takes action to prepare for the establishment of a TLS connection with the D/H-SLP. The SET also calculates the hash of the received SUPL INIT message.

At action D: The SET evaluates the Notification policies and takes the appropriate action. The SET may establish a TLS connection to the D/H-SLP using the D/H-SLP address which is either the H-SLP address provisioned by the Home Network or the D-SLP address provided or verified by the H-SLP. The SET then sends a SUPL POS INIT message to start a positioning session with the D/H-SLP. The SET may send the SUPL POS INIT message even if the SET does not support the intended positioning method indicated in SUPL INIT. The SUPL POS INIT message contains the Location ID (locationId), SET capabilities (sETCapabilities) and the hash (ver) of the received SUPL INIT message calculated in action C. The SUPL POS INIT message may also include a SUPL POS message carrying (i) 3GPP LTE Positioning Protocol (LPP) and/or (ii) LPP with OMA LPP Extensions (LPP/LPPe) and/or (iii) 3GPP2 C.S0022 (referred to herein as TIA-801) positioning protocol messages in line with the D/H-SLP's positioning protocol capabilities (indicated in action B in sLPCapabilities). The SET may also provide its position, if this is supported (as part of LPP/LPPe/TIA-801 or explicitly through the optional position parameter). If a position retrieved in—or calculated based on information received in—the SUPL POS INIT message is available that meets the QoP, the D/H-SLP may directly proceed to action F and not engage in a SUPL POS session.

At action E: SET and D/H-SLP engage in a SUPL POS message exchange to calculate a position. The positioning methods used for this session are determined based on the capabilities exchanged by the SET and the D/H-SLP during the SUPL POS message exchange or optionally in action D. The D/H-SLP calculates the position estimate based on the received positioning measurements (SET-Assisted) or the SET calculates the position estimate based on assistance obtained from the D/H-SLP (SET-Based).

At action F: Once the position calculation is complete, the D/H-SLP sends a SUPL END message to the SET indicating that the location session has ended. The SET may release the TLS connection to the D/H-SLP and release resources related to this session.

At action G: The D/H-SLP sends the position estimate (posresult) back to the SUPL Agent in an MLP SLIA message and the D/H-SLP may release resources related to this session.

Figure 8:
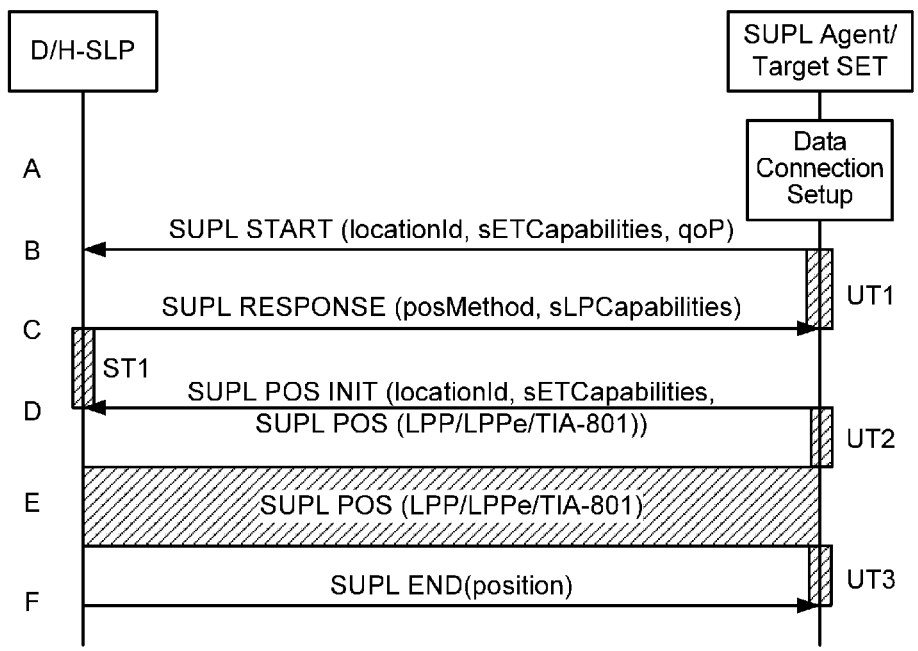
FIG. 8 is a flow diagram illustrating an example message flow that may be used to support certain mobile device initiated location services, in accordance with an implementation.

Attention is drawn next to FIG. 8, which is a flow diagram illustrating an example message flow that may be used to support certain mobile device initiated location services, in accordance with an implementation. More specifically, FIG. 8 illustrates an example message flow for a SET initiated (non-roaming) single fix.

At action A: The SET receives a position request from a SUPL Agent (e.g., an application) on the SET. The SET takes appropriate action to establish a secure TLS connection to either a D-SLP or to its H-SLP (collectively referred to herein as the D/H-SLP). The SET may choose the D-SLP or H-SLP based on any previous authorization for a D-SLP from the H-SLP and based on its current approximate location and serving access network(s) and possibly based on other criteria.

At action B: The SET may use either the default address provisioned by the Home Network for an H-SLP or the address provided or verified by the H-SLP for a D-SLP to establish a secure TLS connection to the D/H-SLP and send a SUPL START message to start a positioning session with the D/H-SLP. The SUPL START message contains the Location ID (locationId), SET capabilities (sETCapabilities) and optionally the desired QoP.

If a previously computed position which meets the requested QoP is available at the D/H-SLP, the D/H-SLP may directly proceed to action F and send a SUPL END message to the SET including the position result (position).

At action C: The D/H-SLP sends a SUPL RESPONSE message to the SET. The SUPL RESPONSE contains the intended positioning method (posMethod) and the SLP Capabilities (sLPCapabilities).

At action D: The SET sends a SUPL POS INIT message to the D/H-SLP. The SET may send the SUPL POS INIT message even if the SET does not support the intended positioning method indicated in SUPL RESPONSE. The SUPL POS INIT message contains the Location ID (locationId), SET capabilities (sETCapabilities) and optionally a SUPL POS message carrying LPP/LPPe and/or TIA-801 positioning protocol messages in line with the D/H-SLP's positioning protocol capabilities (indicated in action C in sLPCapabilities). The SET may also provide its position, if this is supported (as part of LPP/LPPe/TIA-801 or explicitly through the optional position parameter). If a position retrieved in—or calculated based on information received in—the SUPL POS INIT message is available that meets the QoP, the D/H-SLP may directly proceed to action F and not engage in a SUPL POS session.

At action E: SET and D/H-SLP engage in a SUPL POS message exchange to calculate a position. The positioning methods used for this session are determined based on the capabilities exchanged by the SET and the D/H-SLP during the SUPL POS message exchange or optionally in action D. The D/H-SLP calculates the position estimate based on the received positioning measurements (SET-Assisted) or the SET calculates the position estimate based on assistance obtained from the D/H-SLP (SET-Based).

At action F: Once the position calculation is complete, the D/H-SLP sends a SUPL END message to the SET indicating that the location session has ended. If desired, the D/H-SLP may also send the position result (position) in SUPL END. The SET may release the TLS connection to the D/H-SLP and release resources related to this session. The D/H-SLP may release resources related to this session.

Other SUPL location services include, for example, triggered location services, periodic location services, location transfer to a third party, SET location of another SET, location of a SET in association with an emergency call request and transfer of a location URI. These SUPL location services are defined by OMA (e.g. in OMA specification OMA-TS-ULP-V2_0 for SUPL version 2.0 and OMA-TS-ULP-V3_0 for SUPL version 3.0) and may be obtained via SET interaction with a D-SLP or E-SLP. For each location service, SUPL interaction between the SET and the D-SLP or E-SLP may be similar to that between the SET and its H-SLP when obtaining the same service with the differences exemplified in FIG. 7 and FIG. 8.

Figure 9:
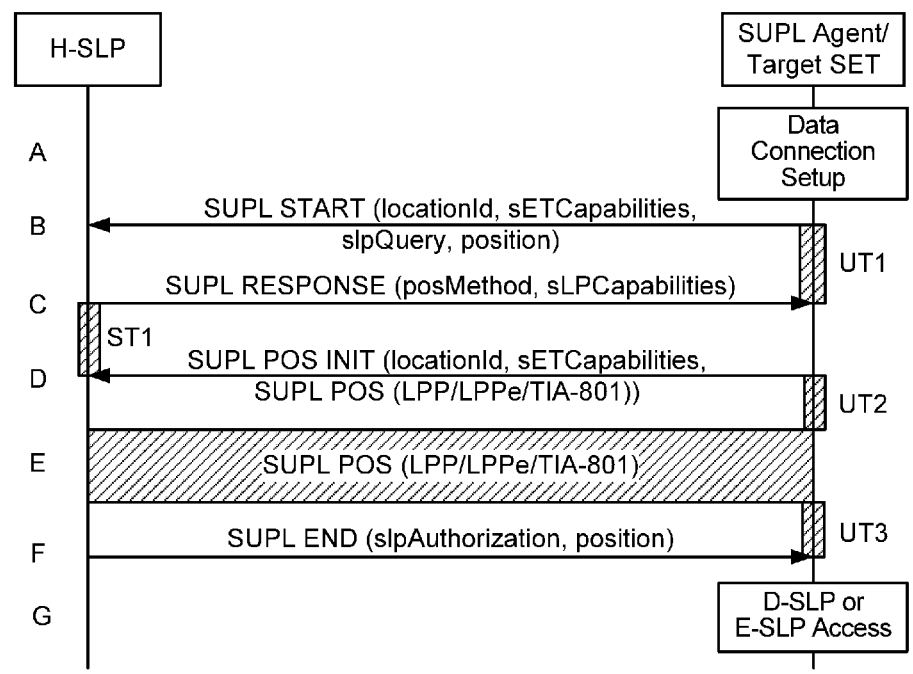
FIG. 9 is a flow diagram illustrating an example message flow that may be used to support authorization of a D-SLP and/or E-SLP for use with certain location services by a H-SLP, in accordance with an implementation.

Attention is drawn next to FIG. 9, which is a flow diagram illustrating an example message flow that may be used to support authorization of a D-SLP and/or E-SLP for use with certain location services by a H-SLP, in accordance with an implementation. In this example, the H-SLP may be an authorizing SLP able to authorize SLPs. This procedure may be invoked by a SET to obtain authorization from the H-SLP for D-SLPs and/or E-SLPs discovered by the SET that are able to provide location services to the SET at or in the vicinity of its current location and/or to receive addresses of other authorized D-SLPs and/or E-SLPs from the H-SLP that are able to provide location services to the SET at or in the vicinity of its current location. The procedure may also be invoked by a SET to obtain authorization from the H-SLP for D-SLPs and/or E-SLPs discovered by the SET that provide location services at some location remote from the SET—e.g. a location that the SET's user expects to visit at some later time. The H-SLP is not compelled to provide authorization in such cases but may nevertheless chose to do so in order to improve location support. Note that there may be an arrangement between the provider of an H-SLP and the provider of a D-SLP or E-SLP to avoid service overload to the D-SLP or E-SLP (herein collectively referred to as the D/E-SLP). The arrangement may limit the number of SETs for which the D/E-SLP may be simultaneously authorized.

At action A: The SET invokes the procedure to obtain the addresses of up to some maximum number (e.g. 10) authorized D-SLPs and/or up to some other maximum number (e.g. 10) authorized E-SLPs from the H-SLP that are able to provide location services to the SET at or in the vicinity of its current location or, in some cases, at some remote location. The procedure may be invoked under any of the following conditions once any minimum retry period for any previous invocation of this procedure has expired: (a) the SET discovers a D-SLP or E-SLP address applicable to its current location or to a remote location that it would like to have authorized (b) in the case of D-SLP authorization, the SET is unable to obtain adequate positioning service from the H-SLP and either has no currently authorized D-SLPs or has currently authorized D-SLPs, access to which is forbidden due to geographic area or access network restrictions (note that a D-SLP may remain authorized until the associated service duration has expired, in certain circumstances); and/or (c) in the case of E-SLP authorization, the SET is accessing a network that is not the home network, needs access to an E-SLP and either has no currently authorized E-SLPs or has currently authorized E-SLPs, access to which is forbidden due to geographic area or access network restrictions (note that an E-SLP may remain authorized until the associated service duration has expired, in certain circumstances). The SET may take appropriate action to establish a secure TLS connection to the H-SLP.

At action B: The SET may use the default address provisioned by the Home Network to establish a secure TLS connection to the H-SLP and send a SUPL START message to start a positioning session with the H-SLP. The SUPL START message contains the Location ID (locationId) and the SET capabilities (sETCapabilities). The SUPL START message also contains an SLP Query parameter (slpQuery) indicating whether the SET requests D-SLP and/or E-SLP addresses. For a D-SLP request, the SET may include a list of any D-SLP addresses currently authorized by the H-SLP and may include a list of preferred D-SLP addresses (e.g. discovered D-SLP addresses) and/or a list of not preferred D-SLP addresses (e.g. D-SLPs the SET could not previously obtain service from). An address on the first list may appear on the second or third list (but not on both). For an E-SLP request, the SET may include three lists of E-SLP addresses corresponding exactly to those for a D-SLP request. In the case of a request for a D-SLP address, the SET may also provide the QoP desired from the D-SLP (e.g. containing the location accuracy preferred for any authorized D-SLP). The SET may also include its current position estimate if it is available.

At action C: The H-SLP proceeds to action F if it does not need to obtain the position of the SET or verify any position provided in action B. Otherwise, the H-SLP sends a SUPL RESPONSE message to the SET. The SUPL RESPONSE message contains the intended positioning method (posMethod) and the SLP Capabilities (sLPCapabilities).

At action D: The SET sends a SUPL POS INIT message to the H-SLP. The SET may send the SUPL POS INIT message even if the SET does not support the intended positioning method indicated in SUPL RESPONSE. The SUPL POS INIT message contains the Location ID (locationId), SET capabilities (sETCapabilities) and optionally a SUPL POS message carrying LPP, LPP/LPPe and/or TIA-801 positioning protocol messages in line with the H-SLP's positioning protocol capabilities (indicated in action C in sLPCapabilities). The SET may also provide its position, if this is supported (as part of LPP/LPPe/TIA-801 or explicitly through the optional position parameter). If a position retrieved in—or calculated based on information received in—the SUPL POS INIT message is available that meets the desired QoP, the D/H-SLP may directly proceed to action F and not engage in a SUPL POS session.

At action E: SET and H-SLP engage in a SUPL POS message exchange to calculate a position. The positioning methods used for this session are determined based on the capabilities exchanged by the SET and the H-SLP during the SUPL POS message exchange or optionally in action D. The H-SLP calculates the position estimate based on the received positioning measurements (SET-Assisted) or the SET calculates the position estimate based on assistance obtained from the H-SLP (SET-Based).

At action F: Once any position calculation is complete, the H-SLP determines a new set of authorized D-SLP addresses if D-SLP addresses were requested and/or a new set of authorized E-SLP addresses if E-SLP addresses were requested. If the SET requested a D-SLP address and provided a QoP associated with this request in action B, the H-SLP may take the QoP into account as one factor in determining whether to provide any D-SLP addresses. The H-SLP sends a SUPL END message to the SET with an SLP Authorization parameter (slpAuthorization) containing a list of authorized D-SLP addresses if D-SLP addresses were requested and/or a list of authorized E-SLP addresses if E-SLP addresses were requested. The addresses in each list may be included in priority order, highest priority first, and may replace any previous list of authorized D-SLPs or E-SLPs that the SET may have received previously from the H-SLP. The lack of such a list or a list containing no addresses for a particular requested SLP type may mean that no addresses for this requested SLP type were authorized and the SET may remove any SLPs of this type previously authorized by the H-SLP. For each provided D-SLP or E-SLP address, the H-SLP may include the service duration for which the SLP address may be considered valid, the service area within which the SLP may be accessed, a list of serving access networks from which the SLP may be accessed and a combination type that defines how the service area and access network restrictions are to be combined. In the case of an authorized D-SLP address, the H-SLP may also provide a list of services that the SET is permitted to engage in with this D-SLP and may provide a preference for accessing a D-SLP versus accessing the H-SLP for any SET initiated location request. When D-SLP addresses are authorized by the H-SLP, the H-SLP may indicate whether it wishes to receive a notification from the SET whenever the SET changes access to a different D-SLP. The H-SLP may also indicate whether it wishes to receive such notifications for SET access to D-SLPs that are authorized to provide network initiated services. Whether or not the H-SLP is able to return any authorized D-SLP and/or E-SLP addresses, the H-SLP may return a minimum retry period for repeating the D-SLP and E-SLP Authorization procedure. The absence of a minimum retry period may be treated the same as a zero retry period. The H-SLP may also provide any position estimate computed in action E. The SET may release the TLS connection to the H-SLP and release resources related to this session. The H-SLP may release resources related to this session.

At action G: The SET may subsequently access for SET initiated location services (e.g. as exemplified in FIG. 8) any E-SLP or D-SLP authorized by the H-SLP in action F according to the following considerations: (a) D-SLPs and E-SLPs may be accessed in priority order—where a lower priority address is accessed when all higher priority addresses are precluded by some other condition or cannot provide service; (b) a D-SLP or E-SLP may be accessed so long as any service duration for the D-SLP or E-SLP has not expired (NOTE: A SET may terminate any session in progress with a D-SLP or E-SLP when the service duration expires unless regulatory requirements in the case of an E-SLP require otherwise. In order to avoid loss of service, a SET may request reauthorization from the H-SLP of a D/E-SLP that is currently being used some time (e.g., 5 to 10 minutes) before the service duration expires); (c) a D-SLP or E-SLP may be accessed if the SET satisfies any provided service area and access network restrictions.

If the combination type is "AND", the SET may need to be within the service area and using an access network provided for the D/E-SLP in order to access the D/E-SLP. If the combination type is "OR", the SET may need to be within the service area or using an access network provided for the D/E-SLP in order to access the D/E-SLP. If the combination type is "Conditional OR", the SET may need to be within the service area or if the SET cannot determine whether it is within the service area then the SET may need to be using an access network provided for the D/E-SLP in order to access the D/E-SLP. NOTE: A SET may use its most recent location estimate (current or previous) to determine any service area condition. The determination may be probabilistic (i.e. determining location within the service area with some probability). Before the conditions for accessing a D/E-SLP are fulfilled, the SET may not access the D/E-SLP to help verify a service area condition. After the access conditions are fulfilled, the SET may periodically re-verify them. If re-verification fails i.e. if the SET is no longer within the service area, the SET may cease access and terminate any ongoing sessions.

In the case of D-SLP access, a SET may request an authorized service and may not request a non-authorized service. This condition may be ignored when the H-SLP did not provide a list of authorized services.

In the case of D-SLP access, the SET may follow any preference provided for H-SLP access. If H-SLP access is indicated as "not allowed", the SET may NOT access the H-SLP (and thus may access a D-SLP) whenever the conditions for accessing at least one D-SLP are fulfilled. Note that this means the H-SLP may not be accessed even when no D-SLP may provide the desired service if the SET has already attempted access to at least one D-SLP. If H-SLP access is indicated as "not preferred", the SET may access the H-SLP if no D-SLP could provide the service. If H-SLP access is indicated as "preferred", the SET may access a D-SLP after attempting (and failing) to obtain service from the H-SLP. If no preference is provided, the SET may decide its own preference for accessing a D-SLP versus the H-SLP.

If access to a D-SLP, E-SLP or the H-SLP fails (e.g. the SET cannot establish a secure IP connection or the D-SLP, E-SLP or H-SLP cannot provide the desired service), a SET may access another D-SLP. E-SLP or the H-SLP according to the above considerations.

For a Network Initiated service request from an authorized D-SLP, the SET may ignore the above restrictions as long as the D-SLP was authorized to support the particular Network Initiated service requested. Note that this means that a SET may accept a Network Initiated session request from an authorized D-SLP or E-SLP even when outside the service area of the D-SLP or E-SLP and/or when not using an allowed access network. For an Network Initiated service request from an E-SLP, whether authorized or not, the SET may first follow any local regulations regarding support. A D-SLP or E-SLP authorization may be considered to be terminated once any service duration has expired. The SET may then remove any internal data associated with this D-SLP or E-SLP.

Figure 10:
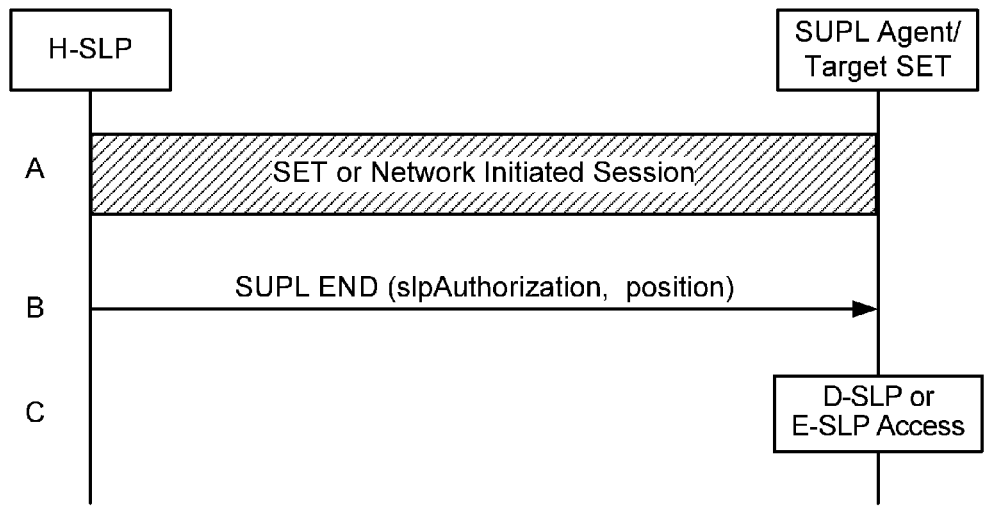
FIG. 10 is a flow diagram illustrating an example message flow that may be used to support unsolicited authorization of a D-SLP and/or E-SLP for use with certain location services, in accordance with an implementation.

Attention is drawn next to FIG. 10, which is a flow diagram illustrating an example message flow that may be used to support unsolicited authorization of a D-SLP and/or E-SLP for use with certain location services, in accordance with an implementation. This procedure may be invoked by the H-SLP to provide authorized D-SLP and/or E-SLP addresses to a SET. The procedure is applicable when a SUPL END is sent by the H-SLP to normally terminate a SUPL session.

At action A: The SET and H-SLP engage in an immediate or deferred SUPL session that may be initiated by the SET or by the H-SLP. Examples of action A include the network initiated location session in FIG. 7 and the SET initiated location session in FIG. 8.

At action B: Once the SUPL session is complete except for the sending of a final SUPL END message, the H-SLP determines a set of authorized D-SLP addresses and/or E-SLP addresses which may be based on the current SET location and current access network(s) used by the SET—e.g. as obtained by the H-SLP in action A. The H-SLP sends a SUPL END message to the SET with an SLP Authorization parameter (slpAuthorization) containing a list of authorized D-SLP and/or E-SLP addresses. The addresses in each list may be included in priority order, highest priority first, and replace any previous list of authorized D-SLPs or E-SLPs that the SET may have received from the H-SLP. For each provided D-SLP or E-SLP address, the H-SLP may include the service duration for which the SLP address may be considered valid, the service area within which the SLP address may be accessed, a list of serving access networks from which the SLP address may be accessed and a combination type that defines how the service area and access network restrictions are to be combined. In the case of a provided D-SLP address, an H-SLP may provide a list of services that the SET is permitted to engage in with this D-SLP. An H-SLP may also provide a preference for accessing the H-SLP versus accessing a D-SLP and/or may provide a request for notifying the H-SLP when a D-SLP is accessed. The H-SLP may also return a minimum retry period for querying the H-SLP for a further D-SLP and/or E-SLP Authorization. The absence of a minimum retry period may be treated the same as a zero retry period. The SET may release the TLS connection to the H-SLP and release resources related to the session. The H-SLP may release resources related to the session.

At action C: The SET may subsequently access any E-SLP or D-SLP provided by the H-SLP in action B for SET initiated location services and/or may accept network initiated location requests from any such D-SLP or E-SLP. The policies for such access may be the same as those defined in action G of FIG. 9.

Figure 11:
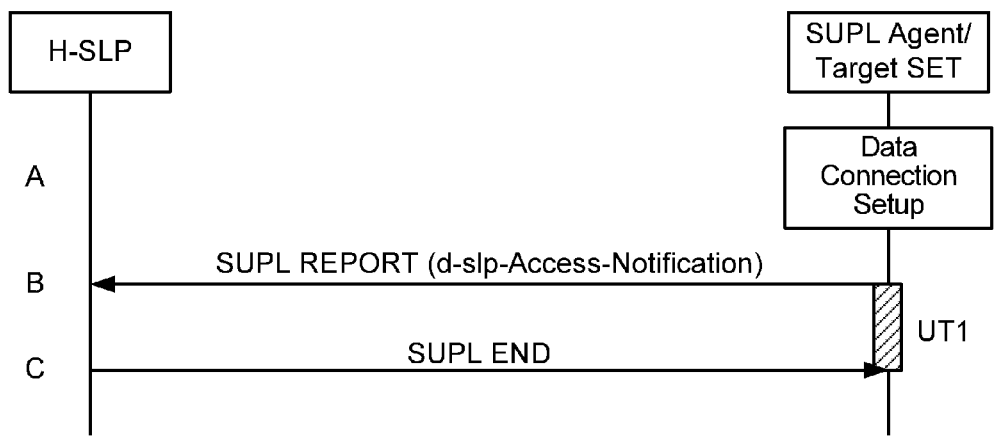
FIG. 11 is a flow diagram illustrating an example message flow that may be used to provide notification to an H-SLP with regard to a mobile device accessing a D-SLP with certain location services, in accordance with an implementation.

Attention is drawn next to FIG. 11, which is a flow diagram illustrating an example message flow that may be used to provide notification to an H-SLP with regard to a mobile device accessing a D-SLP/E-SLP with certain location services, in accordance with an implementation. This procedure may be invoked by a SET to notify the H-SLP about change of D-SLP access by the SET. This may enable the H-SLP to track which D-SLP will have access to the SET to perform an Network Initiated location service—e.g. if a location request from an external LCS Agent sent to the H-SLP needs to be forwarded or redirected to the D-SLP. In the event that the H-SLP cannot be reached, the SET may reattempt the procedure at a later time and may notify the H-SLP of the most recently accessed D-SLP. To avoid being notified about D-SLPs that are not allowed to perform network initiated services, the H-SLP may restrict this procedure to D-SLPs that are authorized to perform network initiated services.

At action A: The SET accesses a D-SLP either for the first time or for the first time after it has accessed one or more other D-SLPs that were notified to the H-SLP. If the D-SLP was not authorized to perform network initiated services and the H-SLP requested notification for D-SLPs authorized to perform network initiated services, the SET may take no action. Otherwise, the SET may take appropriate action to establish a secure TLS connection to the H-SLP.

At action B: The SET may use the default address provisioned by the Home Network for an H-SLP to establish a secure TLS connection to the H-SLP and may send a SUPL REPORT message to the H-SLP. The SUPL REPORT message may contain the address of the accessed D-SLP.

The H-SLP may send a SUPL END message to the SET indicating that the location session has ended. The H-SLP may release resources related to this session.

Figure 12:
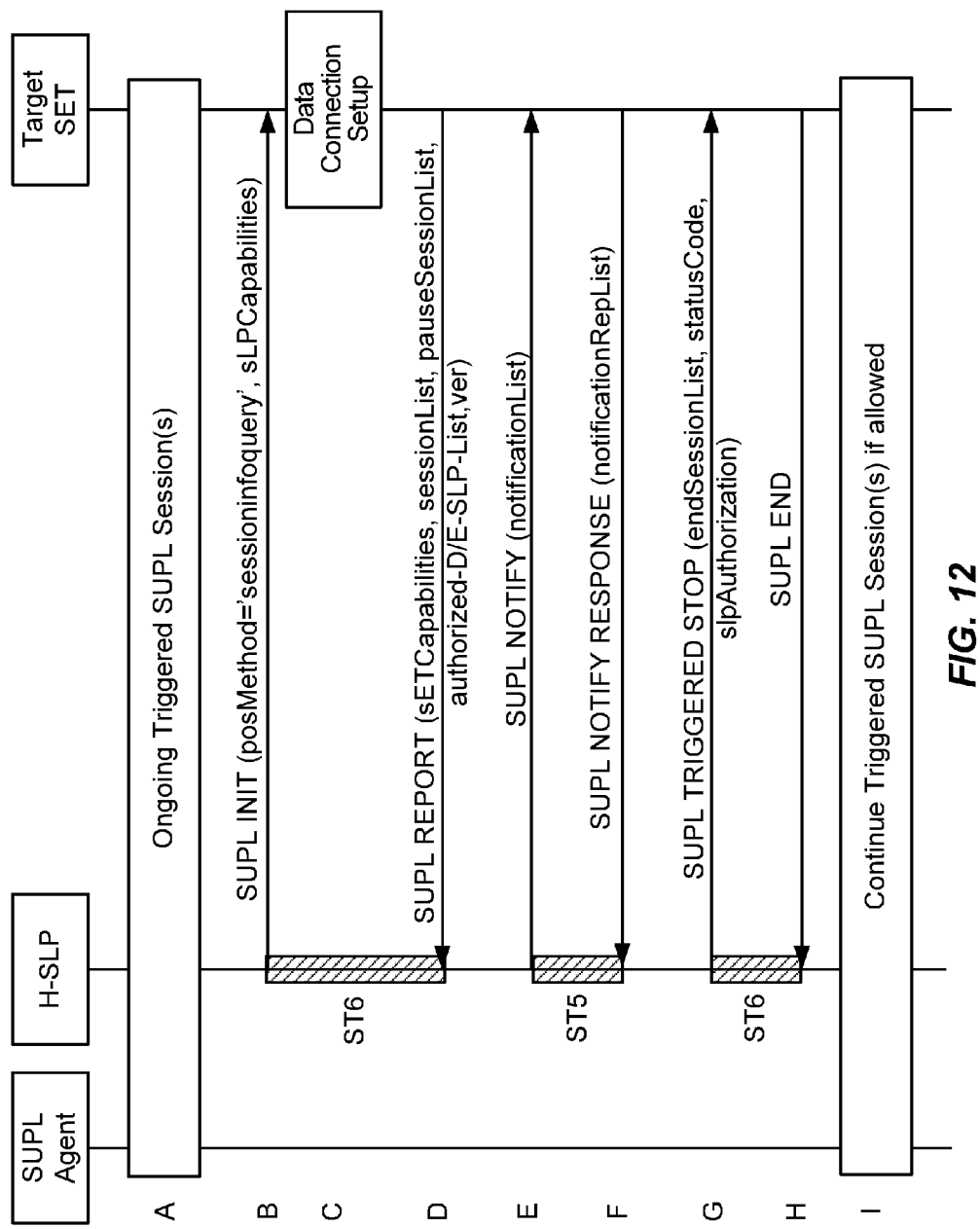
FIG. 12 is a flow diagram illustrating an example message flow that may be used to obtain session information regarding certain location services with a re-notification, in accordance with an implementation.

Attention is drawn next to FIG. 12, which is a flow diagram illustrating an example message flow that may be used to obtain session information regarding certain location services with a re-notification, in accordance with an implementation. The message flow may be used by an H-SLP to query a SET for a list of D-SLPs and/or E-SLPs currently authorized for the SET. After receiving this list, the H-SLP may choose to provide the SET with a new list of authorized D-SLPs and/or E-SLPs.

A Session Info Query service may enable an H-SLP to perform one or more of the following operations (depending on the capability of an SET): query the SET for active SUPL session information; perform re-notification or re-notification and verification for active Network Initiated sessions; terminate any ongoing Triggered sessions without waiting for the next report interval; query the SET regarding currently authorized D-SLPs and/or E-SLPs; and/or provide new D-SLP and/or E-SLP addresses. If one of these procedures is attempted and a SET does not support the service, the SET may, for example, send the SUPL END message containing the session-id of the Session Info Query service and the status code "serviceNotSupported" to the H-SLP.

At action A: One or more triggered SUPL sessions may be in progress.

At action B: The H-SLP initiates the "query for session info" session with the SET using the SUPL INIT message. The SUPL INIT message contains the positioning method (posMethod) and SLP Capabilities (sLPCapabilities). Query for session information is indicated by the positioning method (posMethod): sessioninfoquery. Before the SUPL INIT message is sent, the H-SLP also computes and stores a hash of the message.

At action C: The SET analyses the received SUPL INIT message. If found to be non authentic, the SET takes no further actions. Otherwise the SET takes needed action preparing for the establishment of a TLS connection with the H-SLP.

At action D: The SET returns the SUPL REPORT message to the H-SLP including a list of session-ids (sessionList) of all currently active sessions with the requesting H-SLP. The SET may also include a list of the addresses of currently authorized D-SLPs and/or E-SLPs (Authorized-D/E-SLP-List), the SET may include a list of the addresses of all D-SLPs (Authorized-D-SLP-List) currently authorized. Currently authorized in this context means that any service duration provided earlier by the H-SLP for a D-SLP or E-SLP has not yet expired. The SET may also send the SET Capabilities (sETCapabilities) in the SUPL REPORT message. If any sessions are paused, the SET may also include a list of session-ids (pauseSessionList) of all currently paused session. The SUPL REPORT message also contains a hash of the received SUPL INIT message (ver). NOTE: a sessionList a also includes any paused session(s) because the paused session is considered as an active session.

At action E: If re-notification or re-notification and verification is needed based upon a check of the subscriber privacy and the elapsed time since notification/verification last occurred for any active triggered sessions as indicated in the sessionList parameter, the SUPL NOTIFY message is sent to the SET including a list of session-ids of all sessions that needs re-notification or re-notification and verification (notificationList). The notificationList parameter also includes a notification type of each session. If there is no session that needs re-notification or re-notification and verification, the H-SLP may directly send the SUPL END message to the SET. The SUPL END may include an SLP Authorization that includes a list of authorized D-SLP addresses and/or a list of authorized E-SLP addresses. The contents and treatment of these lists may be the same as that described in actions F and G of FIG. 9 except that if a list is not provided for a particular SLP type, the SET may continue to use the previous authorization for this SLP type. Note that if a list is provided that contains no SLP addresses, then the previous authorized list may be removed.

At action F: The SET may send the SUPL NOTIFY RESPONSE message to the H-SLP. If notification and verification was desired in action E then the SUPL NOTIFY RESPONSE message includes a list of verification responses (NotificationRespList) from the user.

At action G: If the NotificationRespList received in action F contains one or more response types of "Not Allowed" to deny consent for the re-verification, the H-SLP sends the SUPL TRIGGERED STOP message to the SET including a list of session-ids of all sessions to cancel (endSessionList). The SUPL TRIGGERED STOP also contains a statusCode of "consentDeniedByUser" and may include an SLP Authorization. The SET may release resources related to sessions indicated in the endSessionList parameter and may treat any SLP Authorization the same as in action E. If there is no session to cancel, the H-SLP may directly send the SUPL END message to the SET and may include an SLP Authorization which may be treated by the SET the same as in action E.

At action H: If Step G is performed, the SET acknowledges that it has cancelled triggered sessions and interpreted any SLP Authorization with the SUPL END message sent back to the H-SLP. The SET may release the TLS connection to the H-SLP and release resources related to the Session Info Query session. The H-SLP may release resources related to the Session Info Query session.

At action I: Other remaining triggered SUPL session(s) may continue if applicable.

Figure 13:
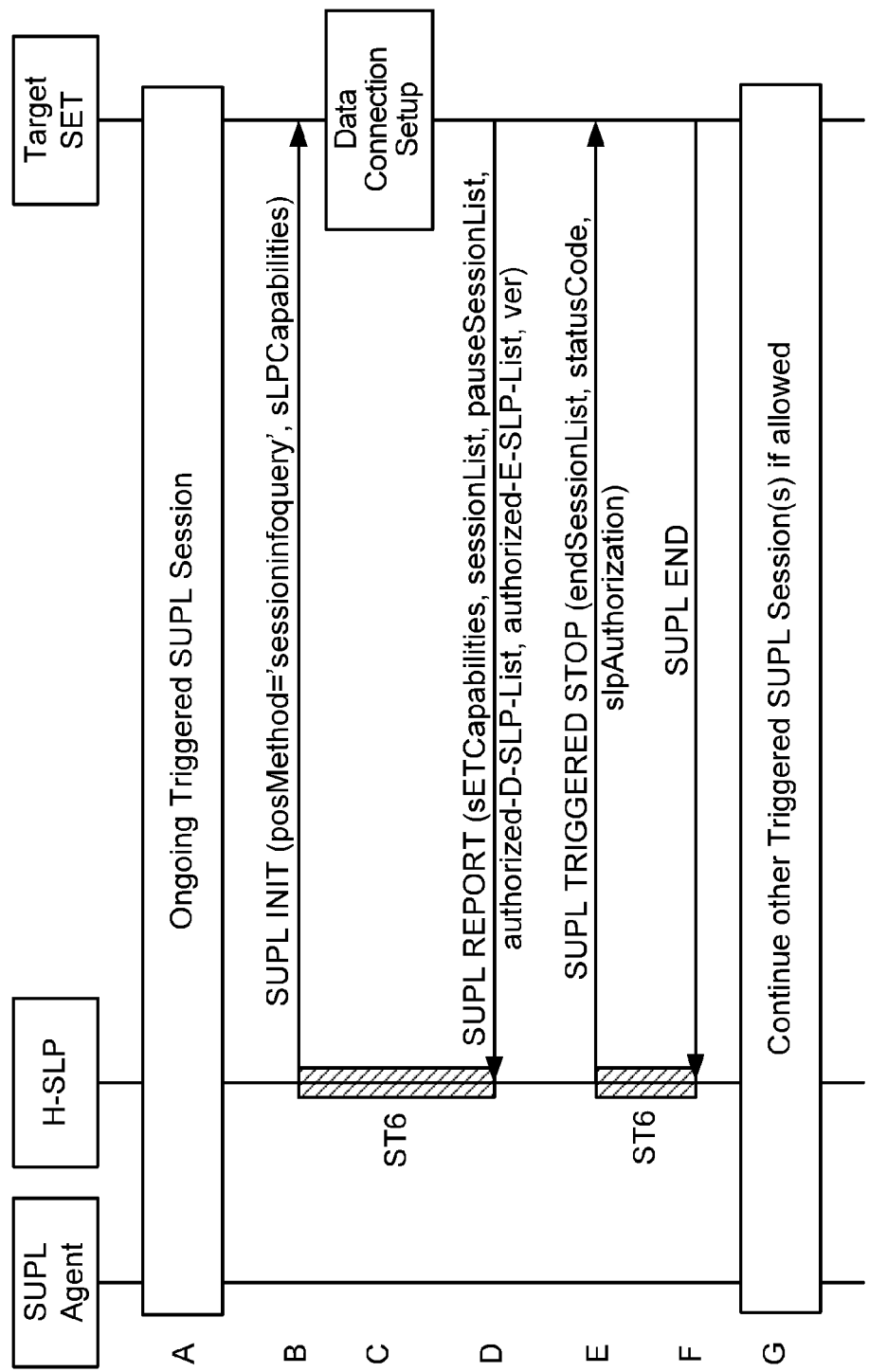
FIG. 13 is a flow diagram illustrating an example message flow that may be used to obtain session information regarding certain location services with a session termination, in accordance with an implementation.

Attention is drawn next to FIG. 13, which is a flow diagram illustrating an example message flow that may be used to obtain session information regarding certain location services with a session termination, in accordance with an implementation. The message flow may be used by an H-SLP to query a SET for a list of D-SLPs and/or E-SLPs currently authorized for the SET. After receiving this list, the H-SLP may choose to provide the SET with a new list of authorized D-SLPs and/or E-SLPs.

At action A: One or more triggered SUPL sessions may be in progress.

At action B: The H-SLP initiates the "query for session info" session with the SET using the SUPL INIT message. The SUPL INIT message contains the positioning method (posMethod) and SLP Capabilities (sLPCapabilities). Query for session information is indicated by the positioning method (posMethod): sessioninfoquery. Before the SUPL INIT message is sent, the D/H-SLP also computes and stores a hash of the message.

At action C: The SET analyses the received SUPL INIT message. If found to be non authentic, the SET takes no further actions. Otherwise the SET takes needed action preparing for the establishment of a TLS connection with the H-SLP.

At action D: The SET returns the SUPL REPORT message to the H-SLP including a list of session-ids (sessionList) of all currently active sessions with the requesting H-SLP. The SET may also include a list of the addresses of currently authorized D-SLPs and/or E-SLPs. The SET may also send the SET Capabilities (sETCapabilities) in the SUPL REPORT message. If any sessions are paused, the SET may also include a list of session-ids (pauseSessionList) of all currently paused session. The SUPL REPORT message also contains a hash of the received SUPL INIT message (ver).

At action E: The H-SLP sends the SUPL TRIGGERED STOP message to the SET to cancel any active and/or paused triggered session without waiting for the next periodic or area event trigger and it may include an SLP Authorization. The SUPL TRIGGERED STOP message contains a list of session-ids of all sessions to cancel (endSessionList) and a status code (statusCode) of "session Stopped". The SET may release resources related to sessions indicated in the endSessionList parameter and may treat any SLP Authorization from the H-SLP the same as in action E in FIG. 12. If there is no session to cancel, the H-SLP may directly send the SUPL END message to the SET and may include an SLP Authorization which may be treated by the SET the same as in action E in FIG. 16.

At action F: The SET acknowledges that it has cancelled triggered sessions and interpreted any SLP Authorization with the SUPL END message sent back to the H-SLP. The SET may release the TLS connection to the H-SLP and release resources related to the Session Info Query session. The H-SLP may release resources related to the Session Info Query session.

At action G: Triggered SUPL session(s) may continue if applicable.

The following sections provide further information with regard to certain example messages that may be used in certain example implementations as presented above.

A SUPL START is the initial message from the SET to the SLP or the response to the SUPL INIT message in Network initiated Generic SUPL Session (GSS). Certain parameters in a SUPL START are mutually exclusive and may not be included together. The parameters are as follows listed in priority order, highest priority first: Third Party; Location URI Request; SLP Query; and/or GSS Parameters, in certain implementations.

When more than one parameter in the above list is included in a SUPL START, the SLP may accept the highest priority parameter and ignore all lower priority parameters. If the result is a badly formed SUPL START message, the SLP may return a SUPL END message and an error code.

Table 1 illustrates an example SUPL START message. Each row in the table describes a separate parameter for the SUPL START message and includes the parameter name, whether inclusion in a SUPL START is mandatory (M), optional (O) or conditional (CV) and a brief description of the parameter function and content. A parameter that is part of a previous parameter in the table is indicated using the character ">" in front of its name. The ">" character is repeated to indicate successive levels of nesting. For example, a list of parameters <"A", ">B", ">C", ">>D", ">>>E", ">F", "G"> indicates that parameters "B", "C" and "F" are part of parameter "A" (at a first level of nesting), that parameter "D" is part of parameter "C" (and thus also part of parameter "A" but nested inside "C"), that parameter "E" is part of parameter "D" (and thus also part of parameters "C" and "A") and that parameter "G" is not part of parameter "A" but is a separate parameter in the message. The same conventions are applied to the tables describing other messages and parameters listed further down herein

TABLE 1

Example SUPL START message

| Parameter | Presence | Description |
| --- | --- | --- |
| SET capabilities | M | Defines the capabilities of the SET |
| Location ID | M | Defines the current serving cell, current serving WLAN AP or WiMAX BS information of the SET. |
| QoP | O | Desired Quality of Position. QoP and High Accuracy QoP are mutually exclusive. |

TABLE 1-continued

Example SUPL START message

| Parameter | Presence | Description |
|---|---|---|
| Multiple Location IDs | O | This parameter may contain current non-serving cell, current non-serving WLAN AP or current non-serving WiMAX BS information for the SET and/or historic serving or non-serving cell, WLAN AP or WiMAX BS information for the SET. |
| Third Party | CV | This parameter defines a list of third party identities.<br>For the SET Initiated location request without transfer to Third Party, this parameter may NOT be used.<br>For the SET Initiated location request with transfer of location to Third Party mode, this parameter may be used. |
| >Third Party ID | M | The identity of the Third Party. There may be at least one Third Party ID.<br>This parameter may be of type<br>Logical name<br>MSISDN<br>Email address<br>SIP URI<br>IMS Public Identity<br>MIN<br>MDN<br>URI |
| ApplicationID | O | The identifier of the requesting application on the SET. |
| Position | O | Defines the position of the SET. |
| GSS Parameters | O | This parameter is used for GSS in which case it is mandatory. The parameter defines the length of the Generic SUPL Session in terms of either duration or number of SUPL POS messages allowed within one GSS. |
| Location URI Request | CV | This parameter contains a request for a Location URI.<br>This parameter may be included if a Location URI is requested. Location URIs may be requested in the context of immediate SET Initiated SUPL sessions. |
| Location URI Set | O | This parameter contains a set of one or more location URIs. The parameter may be included if the SET received a Location URI or set of Location URIs from another server that are still valid and if the SET is initiating a location session.<br>The SLP may use the received location URI(s) to obtain a separate location estimate for the SET from the server(s) referenced by the location URI(s). The means for doing this are outside the scope of this specification. |
| Ver | CV | This parameter contains a hash of the SUPL INIT message. This parameter is applicable to Network-Initiated GSS. |
| SLP Query | CV | This parameter is only included for a D-SLP or E-SLP Query to the H-SLP. |
| Emergency Services Indication | CV | This parameter indicates whether the SUPL START message is sent to support emergency services (e.g. to support an emergency call).<br>In case of emergency services support, this parameter may be sent. Otherwise, this parameter may NOT be sent. |
| Reference Point Id | CV | This parameter provides a Reference Point Id and is used to indicate that the requested position estimate may be expressed relative to a reference position (relative position). This parameter may be included when the SET requests a relative location estimate and may otherwise be absent.<br>The SLP may reject the request by sending a SUPL END if unable to support location relative to the provided reference point.<br>NOTE: The reference point is defined via its unique Id and not via coordinate points. |

TABLE 1-continued

Example SUPL START message

| Parameter | Presence | Description |
|---|---|---|
| High Accuracy QoP | O | This parameter is used to specify the desired quality of position for high accuracy positioning. If this parameter is present, high accuracy positioning may be used if supported and applicable.<br>QoP and High Accuracy QoP are mutually exclusive. |

Table 1A illustrates an example SUPL INIT message. The SUPL INIT message may be the first message transferred by an SLP (e.g. H-SLP, D-SLP or E-SLP) to a SET for a new SUPL session.

TABLE 1A

Example SUPL INIT Message

| Parameter | Presence | Description |
|---|---|---|
| Positioning Method | M | This parameter defines the positioning method desired by the SLP for the SUPL session or the action requested for the session.<br>In line with the positioning capabilities of the SET (shared with the SLP on the positioning protocol level) the SLP MAY change the positioning method used in the actual positioning session regardless of the positioning method parameter. |
| Notification | O | When Notification Mode is Normal Notification/Verification, this field is used to provide instructions to the SET with respect to notification and privacy. If this field is not present the SET SHALL interpret the request as type "No notification & no verification".<br>When Notification Mode is Notification/Verification based on location, this field SHALL NOT be used by the SLP and the SET. |
| SLP Address | CV | This parameter provides an SLP address for non-proxy mode. |
| QoP | O | Desired Quality of Position. This parameter is also used as reporting criteria for stored historical position estimates. If used in this way, only the spatial components (horacc and veracc) apply and define the accuracy requirements which must be satisfied in order to report any historic position estimate.<br>QoP SHALL NOT be present if High Accuracy QoP is present and vice versa. |
| SLP Mode | M | This parameter indicates if the SLP uses proxy or non-proxy mode. |
| MAC | O | This parameter may be omitted. |
| Key Identity | CV | This parameter may be omitted. |
| Notification Mode | O | This parameter indicates whether the notification and verification is based on location or not. If not present, normal notification is assumed. |
| Supported Network Information | O | This parameter provides information on SLP capabilities and may be omitted. |
| Trigger Type | CV | This parameter indicates network initiated service type:<br>Periodic<br>Area event<br>Velocity event<br>This parameter is conditional and only used if a triggered session is requested in the SUPL INIT message. |

TABLE 1A-continued

Example SUPL INIT Message

| Parameter | Presence | Description |
|---|---|---|
| E-SLP Address | CV | This parameter provides the E-SLP address. This parameter SHALL be included if the sender of the SUPL INIT is an E-SLP. Use of an FQDN is preferred over an IP address unless the request is associated with an ongoing emergency call. |
| Historic Reporting | CV | This parameter defines the criteria for reporting of stored historical position estimates and/or enhanced cell/sector measurements.<br>This parameter is conditional and MUST be used if the SUPL INIT message is used to initiate retrieval of stored historical position estimates and/or enhanced cell/sector measurements. Otherwise this parameter is not used. |
| Protection Level | O | This parameter defines the protection level of the SUPL INIT protection. This parameter is optional. If not present, no protection is implicitly assumed. |
| GNSS Positioning Technology | O | This parameter provides GNSS positioning information and may be omitted. |
| Minimum Major Version | O | This parameter defines the minimum major version supported by the SLP which is compatible with the requested service. This parameter is optional. If not present, the only version compatible with the requested service is the version parameter. The minimum major version must always be smaller than the major version.<br>Range: 0 to 255 |
| SLP Capabilities | O | This parameter defines the SLP capabilities which include the supported positioning protocols (LPP/LPPe and/or TIA-801). |
| GSS Parameters | CV | This parameter is only used for GSS in which case it is mandatory. The parameter defines the length of the Generic SUPL Session in terms of either duration or number of SUPL POS messages allowed within one GSS. |
| Extended Notification | O | This parameter provides additional notification information to the SET. |
| D-SLP Address | CV | This parameter provides the address of a D-SLP and SHALL be included when the sender of the SUPL INIT is a D-SLP. The presence of this parameter allows a recipient SET to determine that the SUPL INIT was sent by a D-SLP and identifies the D-SLP. As an example, this parameter may be sent in action B of FIG. 7. |
| High Accuracy QoP | O | This parameter is used to specify the desired quality of position for high accuracy positioning. If this parameter is present, high accuracy positioning should be used if supported and applicable.<br>This parameter is also used as reporting criteria for stored historical position estimates. If used in this way, only the |

TABLE 1A-continued

Example SUPL INIT Message

| Parameter | Presence | Description |
|---|---|---|
| | | spatial components (horacc and veracc) apply and define the accuracy requirements which must be satisfied in order to report any historic position estimate. QoP and High Accuracy QoP are mutually exclusive. |

A SUPL END message is the message that ends a SUPL procedure, normally or abnormally. The following table illustrates an example SUPL END message:

TABLE 2

Example SUPL END message

| Parameter | Presence | Description |
|---|---|---|
| Position | O | Defines the position result of the SET. |
| Status Code | O | Defines the Status of the message as either an error indication or an information indication. Error indications have values between 0 and 99, information indications have values between 100 and 199. |
| Ver | CV | This parameter contains the hash of the SUPL INIT/SUPL REINIT message and is calculated by the SET. This parameter may be present in situations where the SUPL END message is sent as a direct response to a SUPL INIT/SUPL REINIT message. |
| SET Capabilities | O | Defines the SET Capabilities of the SET. This parameter may be used if the SUPL END message is sent from the SET to the SLP. |
| Location URI Set | O | This parameter contains a set of one or more location URIs. This parameter may be included if the SUPL END message is sent from the SLP to the SET and if the SET had previously requested a Location URI from the SLP. |
| SLP Authorization | CV | This parameter provides one or more authorized D-SLP and/or E-SLP addresses and may include limitations on the use of each address. This parameter is included in a response to a D-SLP or E-SLP Query from the SET to the H-SLP. The parameter may also be included when terminating a Session Info Query from the H-SLP. The parameter may also be used to support unsolicited provision of D-SLP and/or E-SLP addresses by the H-SLP at the end of any SUPL session. Unsolicited provisioning may be used whenever the SET capabilities indicate support for the particular type of D-SLP or E-SLP provision. Any D-SLP addresses or E-SLP addresses provided by an H-SLP may replace any previous D-SLP or E-SLP addresses, respectively, that were provided earlier by the H-SLP. Other provided D-SLP and E-SLP addresses are not affected. |
| Relative Position | O | This parameter defines the position result relative to a reference point or another SET (relative position). This parameter is applicable when sent from the SLP to the SET. |
| Civic Position | O | This parameter defines the position result as civic address. This parameter is applicable when sent from the SLP to the SET. The presence of this parameter is implementation dependent. |
| SUPL INIT Key Response | CV | This parameter is conditional and may be used for Mode A SUPL_INIT_ROOT_KEY Establishment This parameter may be used if SUPL END is sent from the SLP to the SET. |

A SUPL TRIGGERED STOP message is used by the SLP or the SET to end an existing triggered session or to pause/resume an ongoing triggered session. The table below illustrates an example SUPL TRIGGERED STOP message:

TABLE 3

Example SUPL TRIGGERED STOP message

| Parameter | Presence | Description |
|---|---|---|
| Status Code | O | Defines the status code of the message. |
| Request Type | CV | Indicates the request type: Stop Pause Resume This parameter may be included when the SUPL TRIGGERED STOP message is sent to stop, pause or resume the triggered session. This parameter may be sent from the SET to the SLP. |
| End Session List | CV | A list of session-ids of all sessions to cancel. This parameter may be used in the "session-info query" session. This parameter may be sent from the SLP to the SET. |
| SLP Authorization | O | This parameter may be included as part of a Session Info Query from the H-SLP. The parameter provides new authorized D-SLP and/or E-SLP addresses and may include limitations on the use of these addresses. |

A SUPL REPORT message may be used in the following instances:

i. For triggered applications, the SUPL REPORT message is used by the SLP to indicate the end of a positioning procedure (SUPL POS session) to the SET. In this case the SUPL REPORT message may or may not contain a calculated position.

ii. For triggered applications, the SUPL REPORT message may be used to send one or more position result(s) (calculated by the SET) and/or enhanced cell/sector measurement(s) from the SET to the SLP. The enhanced cell/sector/AP measurements are sent in LPP/LPPe/TIA-801 Provide Location Information messages carried within SUPL REPORT. The SUPL REPORT message may be used without a position or velocity result to indicate to the SLP that an Area or Velocity Event has occurred. A result code may optionally be sent to indicate an error condition (e.g. no position available).

iii. As an intermediate report within a continuing batch reporting session, the SUPL REPORT message is used as in triggered applications, but the message may contain the position result(s). This allows the SET to dynamically manage its memory by lowering the amount of data stored on the SET.

iv. SUPL REPORT is used by the SET in response to a session info query from the H-SLP or D-SLP. In this case the SUPL REPORT message contains a list of session-ids of all active SUPL sessions. The SUPL REPORT message may also include the SET Capabilities. For a session info query from the H-SLP, the SUPL REPORT message contains the addresses of all currently authorized D-SLPs and E-SLPs.

v. SUPL REPORT is used by the SET to report change of access to an authorized D-SLP that may support Network Initiated services.

For uplink reporting, if the amount of report data to be sent exceeds the maximum ULP message length (64K Octets), the SET may send the report data in multiple SUPL REPORT messages. An example SUPL REPORT message is illustrated in the table below:

TABLE 4

Example SUPL REPORT message

| Parameter | Presence | Description |
|---|---|---|
| SessionList | O | A list of the session-ids of all active SUPL sessions. The list does not contain the session-id of the "session-info query" session which is already included in the session-id parameter of the SUPL REPORT message. This parameter may be used in the "session-info query" session. |
| SET capabilities | O | Defines the capabilities of the SET. This parameter may be used if the SUPL REPORT message is sent in the context of a "session-info query" session. |
| ReportDataList | O | The Report Data List comprises one up to 1024 occurrences of Report Data. |
| >Report Data | M | Report Data contains the actual data to be reported: Position Data, Measurement Data, Result Code and Time Stamp. |
| >>Position Data | O | A calculated position and the respective positioning mode used (optional). |
| >>>position | M | The calculated position of the SET (including a time stamp). |
| >>>posmethod | O | Positioning method with which the position was calculated. |
| >>>GNSS Positioning Technology | O | Defines any GNSSs used to calculate the position. GPS Galileo SBAS Modernized GPS QZSS GLONASS |
| >>>GANSS Signals Information | O | This parameter may be included to indicate the GANSS Signals (up to 16) used for calculation of the position. GANSS Signals Information defines a list of GANSS Signals. |
| >>>>GANSS Id | M | Defines the GANSS. Integer (0 . . . 15) 0: Galileo 1: SBAS 2: Modernized GPS 3: QZSS 4: GLONASS 5-15: Reserved for future use |
| >>>>GANSS Signals | M | Bitmap (length 8 bits) defining the supported signals for GNSS indicated by GANSS ID. For Galileo, the bits are interpreted as: Bit 0: E1 Bit 1: E5a Bit 2: E5b Bit 3: E5a + E5b Bit 4: E6 Bits 5-7: Spare For Modernized GPS, the bits are interpreted as: Bit 0: L1 C Bit 1: L2 C Bit 2: L5 Bits 3-7: Spare For QZSS, the bits are interpreted as: Bit 0: L1 C/A Bit 1: L1 C Bit 2: L2 C Bit 3: L5 Bits 4-7: Spare For GLONASS, the bits are interpreted as: Bit 0: G1 Bit 1: G2 Bit 2: G3 Bits 3-7: Spare For SBAS, the bits are interpreted as: Bit 0: L1 Bits 1-7: Spare |
| >>Multiple Location Ids | O | Multiple Location Ids. |
| >>Result Code | O | Result Code describing why no position or measurement could be reported: Out of radio coverage No position No measurement No position and no measurement Out of memory Out of memory, intermediate reporting Other |
| >>Time Stamp | O | Time Stamp in either absolute time (UTC Time) or relative time (relative to "now" i.e. when the SUPL REPORT message is sent. This parameter is used if Position Data is not present. If Position Data is present, the timestamp parameter within position is used as timestamp. |
| >>LPP/LPPe/TIA-801 payload | O | This parameter carries LPP/LPPe/TIA-801 payload for sending enhanced cell/sector/AP measurement information. |
| Ver | CV | This parameter contains a hash of the SUPL INIT message. This parameter may be used if the SUPL REPORT message is sent in response to a SUPL INT message. Otherwise this parameter is not applicable. |
| More Components | CV | This parameter is used if the report data to be sent needs to be segmented into multiple SUPL REPORT messages. If present, this parameter indicates that more SUPL REPORT messages will be sent. The last SUPL REPORT message in a series of segments may omit this parameter. |
| Pause Session List | O | A list of session-ids of all paused triggered SUPL sessions. This parameter may be used in the "session-info query" session. |
| Authorized D-SLP List | O | For a response to a Session Info Query from the H-SLP, this parameter carries the addresses of all D-SLPs currently authorized by the H-SLP. A D-SLP is considered to be currently authorized if its associated service duration has not yet expired. |
| Authorized E-SLP List | O | For a response to a Session Info Query from the H-SLP, this parameter carries the addresses of all currently authorized E-SLPs. An E-SLP is considered to be currently authorized if its associated service duration has not yet expired. |
| D-SLP Access Notification | O | This parameter is included to report initial or subsequent access to an authorized D-SLP that may support Network Initiated services. The parameter carries the address of the D-SLP. |
| Relative Position | O | This parameter defines the position result relative to a reference point (relative position). This parameter is applicable when sent from the SLP to the SET. |

TABLE 4-continued

Example SUPL REPORT message

| Parameter | Presence | Description |
|---|---|---|
| Civic Position | O | This parameter defines the position result according to civic address. This parameter is applicable when sent from the SLP to the SET. The presence of this parameter is implementation dependent. |

A SET capabilities parameter may be used to identify capabilities of a SET—for example, may indicate that a SET supports one or more of (i) D-SLP authorization by an H-SLP as in FIG. 9, (ii) E-SLP authorization by an H-SLP as in FIG. 9 and (iii) notification to an H-SLP that the SET has accessed a D-SLP for the first time or for the first time after accessing another D-SLP as in FIG. 11. A SET capabilities parameter may be transferred by a SET to an SLP (e.g. H-SLP, D-SLP, E-SLP) in a SUPL START message, SUPL POS INIT message and/or in other SUPL messages. The recipient SLP (e.g. H-SLP) may use the parameter to decide whether to provide authorized D-SLP and/or E-SLPs to the SET (e.g. using the unsolicited authorization procedure of FIG. 10) and/or to decide whether to request notification of access by a SET to a D-SLP (e.g. according to the procedure of FIG. 11) when providing an authorized D-SLP to the SET, The table below illustrates an example SET capabilities parameter. The same conventions in the table are used as described previously for Table 1 for the SUPL START message except that parameters in the table now refer to sub-parameters of the SET capabilities parameter. These conventions are also used for other parameter tables included further down herein.

TABLE 5

Example SET Capabilities Parameter

| Parameter | Presence | Value/Description |
|---|---|---|
| SET capabilities | — | Describes the capabilities of the SET. |
| >Pos Technology | M | This parameter does not apply to SUPL 3.0. The SLP may ignore this parameter. |
| >>GANSS Position Methods | O | This parameter is not applicable in SUPL 3.0 and may not be used. |
| >Pref Method | M | This parameter is not applicable in SUPL 3.0. The SLP may ignore this parameter. |
| >Pos Protocol | M | Zero or more of the following positioning protocols (bitmap): TIA-801 LPP LPPe Flags for legacy positioning protocols (RRLP and RRC) may be set to FALSE. |
| >>Pos Protocol Version TIA-801 | CV | Describes the protocol version of 3GPP2 C.S0022 (TIA-801) Positioning Protocol. It may be required if TIA-801 is identified in the Pos Protocol parameter. |
| >>>Supported Pos Protocol Version TIA-801 | M | Specifies a list of up to 8 different supported 3GPP2 C.S0022 versions. This parameter may be required (with at least one entry in the list) if TIA-801 is identified in the Pos Protocol parameter. |
| >>>>Revision Number | M | Revision part of document number for the specifications of C.S0022 Positioning Protocol. Value: [0, A-Z] |
| >>>>Point Release Number | M | Point Release number for C.S0022, range: (0 . . . 255) |
| >>>Internal Edit Level | M | Internal Edit Level for C.S0022, range: (0 . . . 255) |
| >>Pos Protocol Version LPP | CV | Describes the protocol version of LPP Positioning Protocol. It may be required if LPP is identified in the Pos Protocol parameter. |
| >>>Major Version Field | M | First (most significant) element of the version number for LPP Positioning Protocol, range: (0 . . . 255) |
| >>>Technical Version Field | M | Second element of the version number for LPP Positioning Protocol, range: (0 . . . 255) |
| >>>Editorial Version Field | M | Third (least significant) element of the version number for LPP Positioning Protocol, range: (0 . . . 255) |
| >>Pos Protocol Version LPPe | CV | Describes the protocol version of LPPe Positioning Protocol. It may be required if LPPe is identified in the Pos Protocol parameter. |
| >>>Major Version Field | M | First (most significant) element of the version number for LPPe Positioning Protocol, range: (0 . . . 255) |
| >>>Minor Version Field | M | Second element of the version number for LPPe Positioning Protocol, range: (0 . . . 255) |

TABLE 5-continued

Example SET Capabilities Parameter

| Parameter | Presence | Value/Description |
| --- | --- | --- |
| >Service Capabilities | O | The service capabilities of the SET are described in this parameter. The SET may send this parameter in SUPL START, SUPL POS INIT, SUPL TRIGGERED START and SUPL END. The purpose of this parameter is to inform the H-SLP or D-SLP about the service capabilities of the SET |
| >>services supported | M | Defines the supported services by the SET. Only Network Initiated services are relevant in this context.<br>Zero or more of the following services are supported:<br>Periodic Trigger<br>Area Event Trigger<br>Velocity Event Trigger |
| >>reporting capabilities | CV | Defines the reporting capabilities of the SET. This parameter is required if periodic triggers are supported by the SET in which case the parameter is mandatory. |
| >>>minimum interval between fixes | M | Defines the minimum interval between fixes allowed by the SET.<br>This parameter is used by the H-SLP or D-SLP to avoid conflict between the desired interval between fixes and the SET's capabilities. Range: 1 to 3600, Units in seconds. |
| >>>maximum interval between fixes | O | Defines the maximum interval between fixes allowed by the SET.<br>This parameter is used by the H-SLP or D-SLP to avoid conflict between the desired interval between fixes and the SET's capabilities. This parameter is optional. If not present, no maximum interval between fixes is specified.<br>Range: 1 to 1440, Units in minutes. |
| >>>rep mode | M | Supported reporting mode(s):<br>Real time<br>Quasi real time<br>Batch reporting<br>(At least one of the three reporting modes may be supported) |
| >>>batch rep cap | CV | Defines the type of batch reporting capabilities supported by the SET (applicable to quasi real time and batch reporting):<br>Report position (true if reporting of position is allowed, false otherwise)<br>Report measurements (true if reporting of measurements is supported, false otherwise)<br>Maximum number of positions (range: 1 to 1024)<br>Maximum number of measurements (range: 1 to 1024) |
| >>event trigger capabilities | CV | Defines the event trigger capabilities of the SET. This parameter is required if area event triggers are supported by the SET in which case the parameter is mandatory. |
| >>>geo area shapes supported | M | This parameter defines the geographic target area shapes supported by the SET in addition to mandatory circular area:<br>Elliptical<br>Polygon |
| >>>max number of geographical target areas supported | O | This parameter defines the maximum number of geographic target areas the SET supports. (range: 1 to 32)<br>This parameter is optional. If not present, the SET does not support geographical target areas. |
| >>>max number of Area Id Lists supported | O | This parameter defines the maximum number of Area Id Lists the SET supports. (range: 1 to 32)<br>This parameter is optional. If not present, the SET does not support Area Ids. |

TABLE 5-continued

Example SET Capabilities Parameter

| Parameter | Presence | Value/Description |
|---|---|---|
| >>>max number of Area Ids supported per Area Id List | CV | This parameter defines the maximum number of Area Ids per Area Id List the SET supports. (range: 1 to 256) This parameter is conditional: if max number of Area Id Lists is present, then this parameter may be present. Otherwise this parameter may NOT be present. |
| >>session capabilities | M | Defines the session capabilities of the SET: Total number of simultaneous sessions (range: 1 to 128). Maximum number of simultaneous periodic triggered sessions (used for periodic triggers) (range: 1 to 32). Maximum number of simultaneous area event triggered sessions (used for area event triggers) (range: 1 to 32). Maximum number of simultaneous velocity event triggered sessions (used for velocity event triggers) (range: 1 to 32). |
| >supported bearers | O | This parameter is not applicable in SUPL 3.0. This parameter may NOT be used. |
| >QoPCapabilities | O | This parameter defines the ability of the SET for reporting and/or receiving high accuracy position and/or velocity results. If parameter is absent capability is not supported. |
| >Civic Position Capabilities | O | This parameter defines the ability of the SET to support absolute civic positioning. If parameter is absent capability is not supported. |
| >Relative Position Capabilities | O | This parameter defines the ability of the SET to support relative positioning. If parameter is absent capability is not supported. |
| >D-SLP Provision from H-SLP | O | This field indicates whether the SET supports provision of authorized D-SLP addresses from the H-SLP. If parameter is absent capability is not supported. |
| >E-SLP Provision-from-H-SLP | O | This field indicates whether the SET supports provision of authorized E-SLP addresses from the H-SLP. If parameter is absent capability is not supported. |
| >D-SLP Notification to H-SLP | O | This field indicates whether the SET is able to notify the H-SLP when the SET changes access to a D-SLP. If parameter is absent capability is not supported. |
| >Sensor Support | O | Defines whether the SET is able to use sensors to calculate or retrieve location estimates and/or velocity estimates reported in a SUPL REPORT within the session. If parameter is absent capability is not supported. A Sensor is a function in the SET that is not controlled by the positioning protocol (LPP/LPPe or TIA-801) and is able to determine location estimates and/or velocity estimates. A Sensor may get estimates or measurements from entities external to the SET or to the device in which the SET resides. If a Sensor is used to determine position then "Position Method" in SUPL REPORT may be set to "Other". |
| SUPL INIT Root Key Status | CV | This parameter is conditional and may be used if Mode A SUPL INIT protection is used. For NULL SUPL INIT Protection and Mode B SUPL INIT Protection, this parameter may NOT be used. |

TABLE 5-continued

Example SET Capabilities Parameter

| Parameter | Presence | Value/Description |
|---|---|---|
| | | This parameter is used by the SET to indicate to the SLP one of the following conditions: Invalid SUPL INIT Root Key Out of Sync SUPL INIT Root Key This parameter may be sent and set to "Invalid SUPL INIT Root Key" if the SET does not have a valid SUPL INIT Root Key. It may be sent and set to "Out of Sync SUPL INIT Root Key" if the SET's SUPL INIT Root Key is out of sync. If the SET has a valid SUPL INIT Root Key which is in sync, this parameter may NOT be sent. |

A SLP Query parameter may be used by a SET to request a list of authorized D-SLP and/or E-SLP addresses from the H-SLP, that are applicable to the current SET location and/or serving access network. An SLP Query parameter may be included in a SUPL START message—e.g. the SUPL START message transferred in action B in FIG. 9. The table below illustrates an example SLP Query parameter:

TABLE 6

Example SLP Query Parameters/Message

| Parameter | Presence | Value/Description |
|---|---|---|
| SLP Query | — | Requests provision of one or more D-SLP and/or E-SLP addresses. |
| >D-SLP Query | O | This parameter may be included in a request for authorized D-SLP addresses. |
| >>Authorized D-SLP Address List | CV | This parameter provides a list of the addresses of any D-SLPs previously authorized by the SLP to which the SLP Query is sent. |
| >>Preferred D-SLP Address List | O | This parameter provides a list of any D-SLP addresses preferred by the SET. This list may include addresses of previously authorized D-SLPs and/or addresses of new D-SLPs discovered by the SET. |
| >>Not preferred D-SLP Addresses | O | This parameter provides a list of any D-SLP addresses not preferred by the SET. This list may include addresses of previously authorized D-SLPs (e.g. that were not able to provide adequate service). |
| >>QoP | O | This parameter indicates which QoP is requested. This parameter may be used by the SLP to authorize D-SLPs. |

TABLE 6-continued

Example SLP Query Parameters/Message

| Parameter | Presence | Value/Description |
|---|---|---|
| >E-SLP Query | O | This parameter may be included in a request for authorized E-SLP addresses. |
| >>Authorized E-SLP Address List | CV | This parameter provides a list of the addresses of any E-SLPs previously authorized by the SLP to which the SLP Query is sent. |
| >>Preferred E-SLP Address List | O | This parameter provides a list of any E-SLP addresses preferred by the SET. This list may include addresses of previously authorized E-SLPs and/or addresses of new E-SLPs discovered by the SET. |
| >>Not preferred E-SLP Addresses | O | This parameter provides a list of any E-SLP addresses not preferred by the SET. This list may include addresses of previously authorized E-SLPs (e.g. that were not able to provide adequate service). |

A SLP Authorization parameter may be used by an H-SLP to provide a SET with one or more authorized D-SLP and/or E-SLP addresses and provide optional limitations on the use of these addresses. An SLP Authorization parameter may be included in a SUPL END message—e.g. the SUPL END message transferred in action F in FIG. 9, and in action B in FIG. 10. An SLP Authorization parameter may also be included in a SUPL TRIGGERED STOP message—e.g. as in action G in FIG. 12 and action E in FIG. 13. The table below illustrates an example SLP Authorization parameter:

TABLE 7

Example SLP Authorization Parameter

| Parameter | Presence | Value/Description |
|---|---|---|
| SLP Authorization | — | Provides one or more authorized D-SLP and/or E-SLP Addresses. |
| >D-SLP Authorization List | CV | This parameter is included to provide one or more authorized D-SLP addresses and associated conditions for accessing each address. D-SLP addresses are provided in priority order (highest priority first) where a higher priority D-SLP may be accessed by the SET in preference to a lower priority D-SLP when associated service area and access network conditions are satisfied. In a response to a SET request for D-SLP addresses, the absence of this parameter or the presence of this parameter containing |

TABLE 7-continued

Example SLP Authorization Parameter

| Parameter | Presence | Value/Description |
|---|---|---|
| | | no D-SLP addresses indicates no D-SLPs are authorized: any D-SLPs previously authorized by the SLP sending the response may then be considered de-authorized by the SET with any associated SUPL sessions in progress being terminated by the SET with a SUPL END message. |
| >>D-SLP List | M | This parameter provides the authorized D-SLP addresses and conditions for accessing each address. |
| >>>D-SLP Address | M | This field provides an authorized D-SLP address in the form of an FQDN. |
| >>>Service Duration | O | This parameter provides the duration of the D-SLP authorization. If this parameter is absent, the duration is unlimited. |
| >>>Service Area | O | This parameter provides a geographic area within which the authorized D-SLP may be accessed. If this parameter is absent, no service area is explicitly authorized though access to the D-SLP may still be permitted via the Access Network List. |
| >>>Access Network List | O | This parameter provides a list of access networks from which the authorized D-SLP address may be accessed. If this parameter is absent, no access networks are explicitly authorized though access to the D-SLP may still be permitted via the Service Area. |
| >>>Combination Type | O | This parameter defines how the Service Area and Access Network List restrictions are combined. The alternatives are: AND (SET may be within the service area AND using an allowed access network) OR (SET may be within the service area OR using an allowed access network) Conditional OR (SET may be within the service area. If the SET cannot determine whether it is within the service area, the SET may use an allowed access network) The default if this parameter is not included is OR. |
| >>>Services | O | This parameter provides a list of services that a SET may engage in with the authorized D-SLP. Allowed services are indicated by a Boolean TRUE value and disallowed services are indicated by FALSE values. A SET may not request or accept a request for any disallowed service. |
| >>H-SLP Access Preference | CV | This parameter is conditional and may be sent by the H-SLP. This parameter indicates whether the H-SLP may be accessed by the SET instead of a D-SLP for SET initiated location services. The following values are supported: Access to H-SLP not allowed Access to H-SLP not preferred (H-SLP to be used as a backup) Access to H-SLP preferred (D-SLP to be used as a backup) Absence of the parameter means there is no preference and the SET may access either the H-SLP or a D-SLP. NOTE: Existing H-SLP sessions may not be affected by this parameter. |
| >>Report D-SLP Access | CV | This parameter is conditional and may be sent by the H-SLP. This parameter is included to request notification from the SET to the H-SLP when the SET changes access to a different D-SLP. The notification may be restricted just to D-SLPs authorized to perform network initiated services. The notification may assist the H-SLP to redirect or forward location |

TABLE 7-continued

Example SLP Authorization Parameter

| Parameter | Presence | Value/Description |
| --- | --- | --- |
| >E-SLP Authorization List | CV | requests for the SET from external SUPL Agents to the most recently notified D-SLP. This parameter is included to provide one or more authorized E-SLP addresses and associated conditions for accessing each address. E-SLP addresses are provided in priority order (highest priority first) where a higher priority E-SLP may be accessed by the SET in preference to a lower priority E-SLP when associated service area and access network conditions are satisfied. In a response to a SET request for E-SLP addresses, the absence of this parameter or the presence of this parameter containing no E-SLP addresses indicates no E-SLPs are authorized: any E-SLPs previously authorized by the SLP sending the response may then be considered de-authorized by the SET with any associated SUPL sessions in progress being terminated by the SET by sending a SUPL END. Exceptions to these policies may exist according to local regulatory requirements - e.g. a SET may accept a Network Initiated request for a single fix from an E-SLP when engaged in an emergency call regardless of whether the E-SLP was or was not authorized by the H-SLP. |
| >>E-SLP List | M | This parameter provides the authorized E-SLP addresses and conditions for accessing each address. |
| >>>E-SLP Address | M | This field provides an authorized E-SLP address in the form of an FQDN. |
| >>>Service Duration | O | This parameter provides the duration of the E-SLP authorization. If this parameter is absent, the duration is unlimited. |
| >>>Service Area | O | This parameter provides a geographic area within which the authorized E-SLP may be accessed. If this parameter is absent, no service area is explicitly authorized though access to the E-SLP may still be permitted via the Access Network List. |
| >>>Access Network List | O | This parameter provides a list of access networks from which the authorized E-SLP address may be accessed. If this parameter is absent, no access networks are explicitly authorized though access to the E-SLP may still be permitted via the Service Area. |
| >>>Combination Type | O | This parameter defines how the Service Area and Access Network List restrictions are combined. The alternatives are: AND (UE may be within the service area AND using an allowed access network) OR (UE may be within the service area OR using an allowed access network) Conditional OR (UE may be within the service area. If the UE cannot determine whether it is within the service area, the UE may use an allowed access network) The default if this parameter is not included is OR. |
| >Minimum retry period | O | This parameter provides the minimum time period that the SET may wait before instigating a new D-SLP or E-SLP Authorization request. The parameter is valid in both a response to a SET SLP Authorization request and in an unsolicited SLP Authorization (e.g. for the Session Info Query procedure or in the SUPL END sent by the H-SLP). The parameter applies to the SLP that sent it. |

An Authorized D-SLP List parameter may be used by a SET to provide any currently authorized D-SLP addresses to the H-SLP. An Authorized D-SLP List parameter may be transferred in a SUPL REPORT message—e.g. as in action D in FIG. 12 and FIG. 13. Table below illustrates an example Authorized D-SLP List parameter:

TABLE 8

Example Authorized D-SLP List Parameters

| Parameter | Presence | Value/Description |
| --- | --- | --- |
| Authorized D-SLP List | — | Provides currently authorized D-SLP addresses |
| >Authorized D-SLP | M | Provides a list of D-SLPs currently authorized by the SLP to which this parameter is sent. |
| >>D-SLP Address | O | This parameter provides a D-SLP address in the form of an FQDN. |

An Authorized E-SLP List parameter may be used by a SET to provide any currently authorized E-SLP addresses to the H-SLP. An Authorized E-SLP List parameter may be transferred in a SUPL REPORT message—e.g. as in action D in FIG. 12 and FIG. 13. The table below illustrates an example Authorized E-SLP List parameter:

TABLE 9

Example Authorized E-SLP List Parameters

| Parameter | Presence | Value/Description |
| --- | --- | --- |
| Authorized E-SLP List | — | Provides currently authorized E-SLP addresses |
| >Authorized E-SLP | M | Provides a list of E-SLPs currently authorized by the SLP to which this parameter is sent. |
| >>E-SLP Address | O | This parameter provides an E-SLP address in the form of an FQDN. |

A D-SLP Access Notification parameter may be used by a SET to provide the address of a recently accessed D-SLP to the H-SLP when the D-SLP is authorized to support Network Initiated services. A D-SLP Access Notification parameter may be transferred in a SUPL REPORT message—e.g. as in action B in FIG. 11. Table below illustrates an example D-SLP Access Notification parameter:

TABLE 10

Example Authorized D-SLP Access Notification Parameters

| Parameter | Presence | Value/Description |
| --- | --- | --- |
| D-SLP Access Report | — | Provides the most recently accessed D-SLP |
| >D-SLP Address | O | This parameter provides the D-SLP address in the form of an FQDN. |

Reference throughout this specification to "one example", "an example", "certain examples", or "example implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information (e.g., as representative data). It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use by one or more computing devices providing an authorizing location server, the method comprising:
    engaging in an immediate or deferred Secure User Plane Location (SUPL) session with a mobile device;
    determining a set of location servers based, at least in part, on a current location and a current set of access networks for said mobile device obtained via said session; and
    transmitting a message to said mobile device, said message indicating said set of location servers as being authorized for location service related access by said mobile device.

2. The method as recited in claim 1, and further comprising:
    obtaining a subsequent message from said mobile device, said subsequent message indicating an occurrence of at least one said location service related access by said mobile device.

3. The method as recited in claim 2, said message further indicating additional information comprising at least one of: an access preference associated with said authorizing location server for location services; a priority ordering corresponding to one or more location servers in said set of location servers; and/or a parameter for at least one location server in said set of location servers.

4. The method as recited in claim 3, said parameter comprising at least one of: a service duration; a service area; and/or a list of access networks available for use by said mobile device.

5. The method as recited in claim 3, and further comprising:
    accessing a particular location server in said set of location servers by said mobile device, said particular location server determined by said mobile device based, at least in part, on said additional information.

6. The method as recited in claim 5, said accessing said particular location server in said set of location servers further comprising accepting one or more network initiated location requests from said particular location server.

7. The method as recited in claim 3, said access preference comprising at least one of: a preference for accessing said authorizing location server versus accessing at least one location server in said set of location servers; and/or a request for notifying said authorizing location server if at least one location server in said set of location servers is accessed.

8. The method as recited in claim 3, said additional information further comprising a minimum retry period for querying said authorizing location server for a further authorization of at least one location server.

9. The method as recited in claim 1, wherein said authorizing location server comprises a SUPL Location Platform (H-SLP), and at least one location server in said set of location servers comprises at least one of: a Discovered SUPL Location Platform (D-SLP); or an Emergency SUPL Location Platform (E-SLP).

10. The method as recited in claim 1, wherein said message comprises a SUPL END message.

11. The method as recited in claim 1, wherein said session is initiated by said mobile device or said authorizing location server.

12. The method as recited in claim 1, wherein said mobile device comprises a SUPL enabled terminal (SET).

13. A method for use by a mobile device, the method comprising:
    engaging in an immediate or deferred Secure User Plane Location (SUPL) session with an authorizing location server;
    transmitting at least a first message to said authorizing location server to determine a current location and a current set of access networks for said mobile device; and
    obtaining a second message from said authorizing location server, said second message indicating a set of location servers as being authorized for location service related access by said mobile device, said set of location servers is being determined based, at least in part, on said current location and said current set of access networks.

14. The method as recited in claim 13, and further comprising:
    communicating a subsequent message to said authorizing location server, said subsequent message indicating an occurrence of at least one said location service related access by said mobile device.

15. The method as recited in claim 13, said second message further indicating additional information comprising at least one of: an access preference associated with said authorizing location server for location services; a priority ordering corresponding to one or more location servers in said set of location servers; and/or a parameter for at least one location server in said set of location servers.

16. The method as recited in claim 15, said parameter comprising at least one of: a service duration; a service area; and/or a list of access networks available for use by said mobile device.

17. The method as recited in claim 15, and further comprising:
    accessing a particular location server in said set of location servers, said particular location server being determined based, at least in part, on said additional information.

18. The method as recited in claim 17, said accessing said particular location server in said set of location servers further comprising accepting one or more network initiated location requests from said particular location server.

19. The method as recited in claim 15, said access preference comprising at least one of: a preference for accessing said authorizing location server versus accessing at least one location server in said set of location servers; and a request for notifying said authorizing location server if at least one location server in said set of location servers is accessed.

20. The method as recited in claim 15, said additional information further comprising a minimum retry period for querying said authorizing location server for a further authorization of at least one location server.

21. The method as recited in claim 13, wherein said authorizing location server comprises a SUPL Location Platform (H-SLP), and at least one location server in said set of location servers comprises at least one of: a Discovered SUPL Location Platform (D-SLP); or an Emergency SUPL Location Platform (E-SLP).

22. The method as recited in claim 13, wherein said second message comprises a SUPL END message.

23. The method as recited in claim 13, wherein said session is initiated by said mobile device or said authorizing location server.

24. The method as recited in claim 13, wherein said mobile device comprises a SUPL enabled terminal (SET).

25. An apparatus for use in an authorizing location server, the apparatus comprising:
    means for engaging in an immediate or deferred Secure User Plane Location (SUPL) session with a mobile device;
    means for determining a set of location servers based, at least in part, on a current location and a current set of access networks for said mobile device obtained via said session; and
    means for transmitting a message to said mobile device, said message indicating said set of location servers as being authorized for location service related access by said mobile device.

26. The apparatus as recited in claim 25, and further comprising:
    means for obtaining a subsequent message from said mobile device, said subsequent message indicating an occurrence of at least one said location service related access by said mobile device.

27. The apparatus as recited in claim 25, said message further indicating additional information comprising at least one of: an access preference associated with said authorizing location server for location services; a priority ordering corresponding to one or more location servers in said set of location servers; and/or a parameter for at least one location server in said set of location servers.

28. The apparatus as recited in claim 27, said parameter comprising at least one of: a service duration; a service area; and/or a list of access networks available for use by said mobile device.

29. The apparatus as recited in claim 27, and further comprising:
    means for accessing a particular location server in said set of location servers by said mobile device, said particular location server determined by said mobile device based, at least in part, on said additional information.

30. The apparatus as recited in claim 27, said access preference comprising at least one of: a preference for accessing said authorizing location server versus accessing at least one location server in said set of location servers; and/or a request for notifying said authorizing location server if at least one location server in said set of location servers is accessed.

31. The apparatus as recited in claim 30, said means for accessing said particular location server in said set of location servers further comprising means for accepting one or more network initiated location requests from said particular location server.

32. The apparatus as recited in claim 27, said additional information further comprising a minimum retry period for querying said authorizing location server for a further authorization of at least one location server.

33. The apparatus as recited in claim 25, wherein said authorizing location server comprises a SUPL Location Platform (H-SLP), and at least one location server in said set of location servers comprises at least one of: a Discovered SUPL Location Platform (D-SLP); or an Emergency SUPL Location Platform (E-SLP).

34. The apparatus as recited in claim 25, wherein said message comprises a SUPL END message.

35. The apparatus as recited in claim 25, wherein said session is initiated by said mobile device or said authorizing location server.

36. The apparatus as recited in claim 25, wherein said mobile device comprises a SUPL enabled terminal (SET).

37. An apparatus for use in an authorizing location server, the apparatus comprising:
    a network interface; and
    one or more processing units to:
        engage in an immediate or deferred Secure User Plane Location (SUPL) session with a mobile device;
        determine a set of location servers to be based, at least in part, on a current location and a current set of access networks for said mobile device obtained via said session; and
        transmit a message to said mobile device, said message to indicate said set of location servers as being authorized for location service related access by said mobile device.

38. The apparatus as recited in claim 37, said one or more processing units further to:
    obtain a subsequent message from said mobile device, said subsequent message to indicate an occurrence of at least one said location service related access by said mobile device.

39. The apparatus as recited in claim 38, said message further to indicate additional information to comprise at least one of: an access preference to be associated with said authorizing location server for location services; a priority ordering to correspond to one or more location servers in said set of location servers; and/or a parameter for at least one location server in said set of location servers.

40. The apparatus as recited in claim 39, said parameter to comprise at least one of: a service duration; a service area; and/or a list of access networks available for use by said mobile device.

41. The apparatus as recited in claim 39, said one or more processing units further to:
    access a particular location server in said set of location servers by said mobile device, said particular location server determined by said mobile device to be based, at least in part, on said additional information.

42. The apparatus as recited in claim 39, said access preference to comprise at least one of: a preference for accessing said authorizing location server versus accessing at least one location server in said set of location servers; and/or a request for notifying said authorizing location server if at least one location server in said set of location servers is accessed.

43. The apparatus as recited in claim 39, said additional information further to comprise a minimum retry period for querying said authorizing location server for a further authorization of at least one location server.

44. The apparatus as recited in claim 41, said accessing said particular location server in said set of location servers further to comprise accepting one or more network initiated location requests from said particular location server.

45. The apparatus as recited in claim 37, wherein said authorizing location server to comprise a SUPL Location Platform (H-SLP), and at least one location server in said set of location servers to comprise at least one of: a Discovered SUPL Location Platform (D-SLP); or an Emergency SUPL Location Platform (E-SLP).

46. The apparatus as recited in claim 37, wherein said message to comprise a SUPL END message.

47. The apparatus as recited in claim 37, wherein said session is to be initiated by said mobile device or said authorizing location server.

48. The apparatus as recited in claim 37, wherein said mobile device to comprise a SUPL enabled terminal (SET).

49. An apparatus for use in an authorizing location server, the apparatus comprising:
a wireless interface; and
one or more processing units to:
engage in an immediate or deferred Secure User Plane Location (SUPL) session with said authorizing location server;
transmit at least a first message to said authorizing location server to determine a current location and a current set of access networks for said mobile device; and
obtain a second message from said authorizing location server, said second message to indicate a set of location servers as being authorized for location service related access by said mobile device, said set of location servers is to be determined to be based, at least in part, on said current location and said current set of access networks.

50. The apparatus as recited in claim 49, said one or more processing units further to:
communicate a subsequent message to said authorizing location server, said subsequent message to indicate an occurrence of at least one said location service related access by said mobile device.

51. The apparatus as recited in claim 49, said second message further to indicate additional information to comprise at least one of: an access preference to be associated with said authorizing location server for location services; a priority ordering to correspond to one or more location servers in said set of location servers; and/or a parameter for at least one location server in said set of location servers.

52. The apparatus as recited in claim 51, said parameter to comprise at least one of: a service duration; a service area; and/or a list of access networks available for use by said mobile device.

53. The apparatus as recited in claim 51, said one or more processing units further to:
access a particular location server in said set of location servers, said particular location server to be determined to be based, at least in part, on said additional information.

54. The apparatus as recited in claim 51, said access preference to comprise at least one of: a preference for accessing said authorizing location server versus accessing at least one location server in said set of location servers; and a request for notifying said authorizing location server if at least one location server in said set of location servers is accessed.

55. The apparatus as recited in claim 51, said additional information further to comprise a minimum retry period for querying said authorizing location server for a further authorization of at least one location server.

56. The apparatus as recited in claim 53, to said access said particular location server in said set of location servers further to accept one or more network initiated location requests from said particular location server.

57. The apparatus as recited in claim 49, wherein said authorizing location server to comprise a SUPL Location Platform (H-SLP), and at least one location server in said set of location servers to comprise at least one of: a Discovered SUPL Location Platform (D-SLP); or an Emergency SUPL Location Platform (E-SLP).

58. The apparatus as recited in claim 49, wherein said second message to comprise a SUPL END message.

59. The apparatus as recited in claim 49, wherein said session is to be initiated by said mobile device or said authorizing location server.

60. The apparatus as recited in claim 49, wherein said mobile device to comprise a SUPL enabled terminal (SET).

61. A non-transitory computer readable storage medium having stored therein computer implementable instructions that are executable by one or more processing units of an authorizing location server to:
engage in an immediate or deferred Secure User Plane Location (SUPL) session with said authorizing location server;
transmit at least a first message to said authorizing location server to determine a current location and a current set of access networks for said mobile device; and
obtain a second message from said authorizing location server, said second message to indicate a set of location servers as being authorized for location service related access by said mobile device, said set of location servers is to be determined to be based, at least in part, on said current location and said current set of access networks.

* * * * *